United States Patent
Seo et al.

(10) Patent No.: US 10,687,073 B2
(45) Date of Patent: Jun. 16, 2020

(54) METHOD FOR ENCODING/DECODING IMAGE AND DEVICE THEREFOR

(71) Applicant: LG ELECTRONICS INC., Seoul (KR)

(72) Inventors: Jungdong Seo, Seoul (KR); Jaehyun Lim, Seoul (KR); Naeri Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 191 days.

(21) Appl. No.: 15/769,261

(22) PCT Filed: Oct. 24, 2016

(86) PCT No.: PCT/KR2016/011943
§ 371 (c)(1),
(2) Date: Apr. 18, 2018

(87) PCT Pub. No.: WO2017/069588
PCT Pub. Date: Apr. 27, 2017

(65) Prior Publication Data
US 2018/0302638 A1 Oct. 18, 2018

Related U.S. Application Data

(60) Provisional application No. 62/245,256, filed on Oct. 22, 2015.

(51) Int. Cl.
*H04N 19/51* (2014.01)
*H04N 19/176* (2014.01)
(Continued)

(52) U.S. Cl.
CPC ........... *H04N 19/51* (2014.11); *H04N 19/119* (2014.11); *H04N 19/137* (2014.11);
(Continued)

(58) Field of Classification Search
CPC ........................................................ H04N 19/51
(Continued)

(56) References Cited

U.S. PATENT DOCUMENTS

| 2004/0081238 A1 | 4/2004 | Parhy |
| 2014/0146876 A1 | 5/2014 | Takehara |
| 2015/0312588 A1* | 10/2015 | Yamamoto ........... H04N 19/105 375/240.15 |

FOREIGN PATENT DOCUMENTS

| JP | 2013042385 | * | 2/2013 | ............... H04N 7/32 |
| JP | 2013042385 A | | 2/2013 | |

(Continued)

*Primary Examiner* — Yulin Sun
(74) *Attorney, Agent, or Firm* — Dentons US LLP

(57) ABSTRACT

Disclosed are a method for encoding/decoding an image and a device therefor. Particularly, a method by which a decoding device decodes an image comprises the steps of: deriving a part mode of a coding block within a predefined part mode set; decoding a motion parameter in a prediction block unit partitioned from the coding block according to the part mode; and generating a predicted block by using the motion parameter decoded in the prediction block unit, wherein the part mode set includes an asymmetric 4-block part mode, the asymmetric 4-block part mode enables four prediction blocks to be partitioned from the coding block, and a horizontal partition and/or a vertical partition can be defined as an asymmetric partition form.

4 Claims, 14 Drawing Sheets

(51) Int. Cl.
 *H04N 19/119* (2014.01)
 *H04N 19/137* (2014.01)
 *H04N 19/157* (2014.01)
 *H04N 19/172* (2014.01)
 *H04N 19/174* (2014.01)
 *H04N 19/46* (2014.01)
 *H04N 19/70* (2014.01)

(52) U.S. Cl.
 CPC ......... *H04N 19/157* (2014.11); *H04N 19/172* (2014.11); *H04N 19/174* (2014.11); *H04N 19/176* (2014.11); *H04N 19/46* (2014.11); *H04N 19/70* (2014.11)

(58) Field of Classification Search
 USPC .................................................. 375/240.12
 See application file for complete search history.

(56) References Cited

FOREIGN PATENT DOCUMENTS

| | | |
|---|---|---|
| KR | 20130081676 A | 7/2013 |
| KR | 20130088097 A | 8/2013 |

* cited by examiner

[Fig. 1]
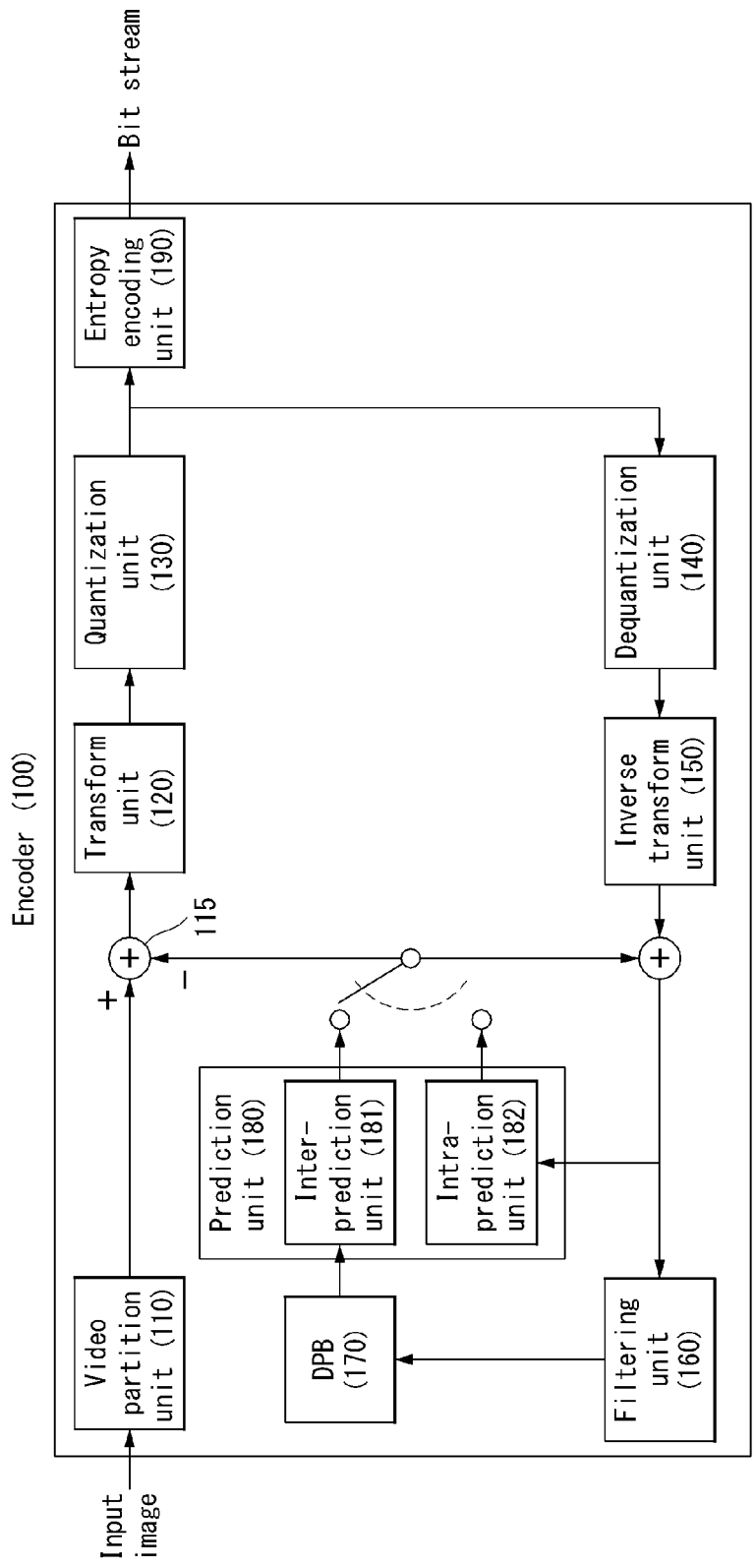

[Fig. 2]
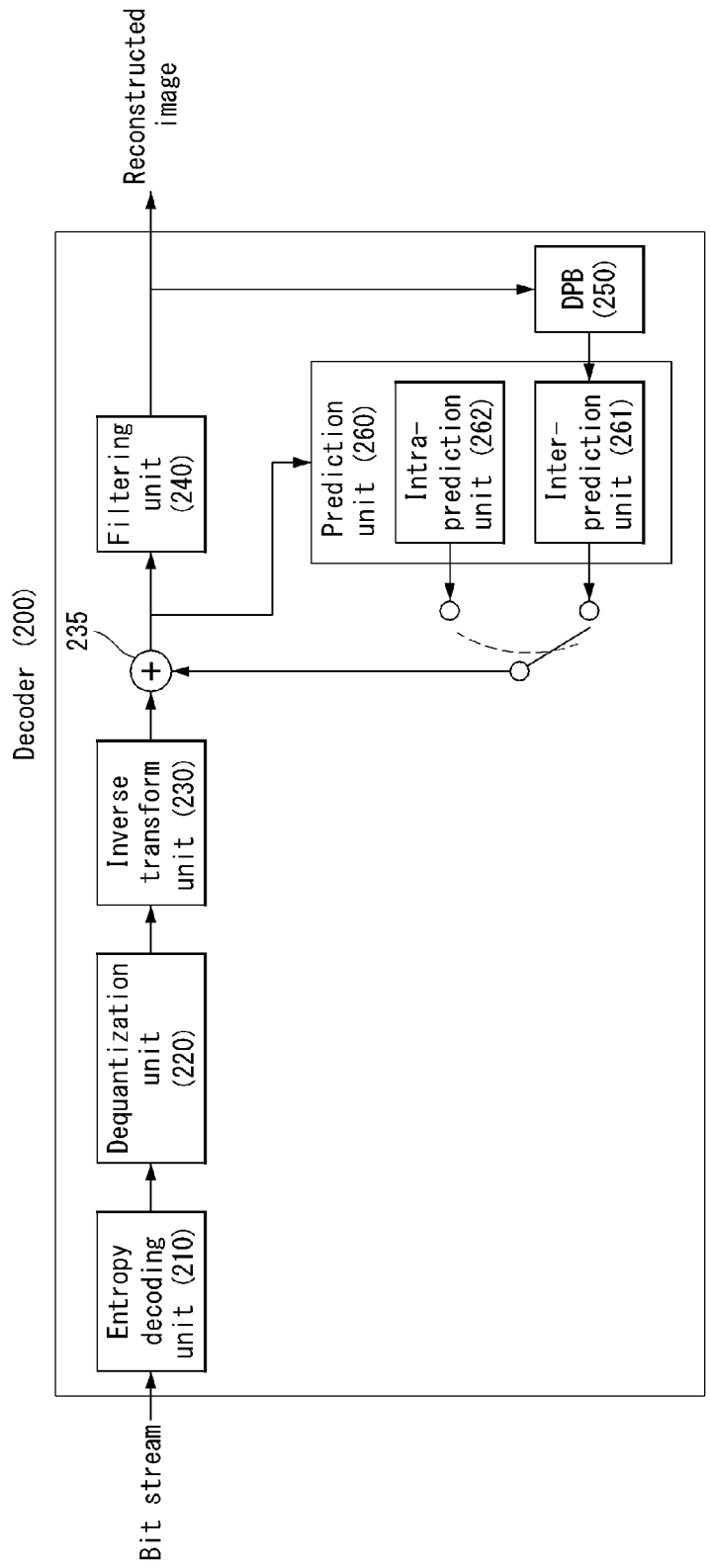

[Fig. 3]
Depth = 0
Depth = 1
Depth = 2
Depth = 3
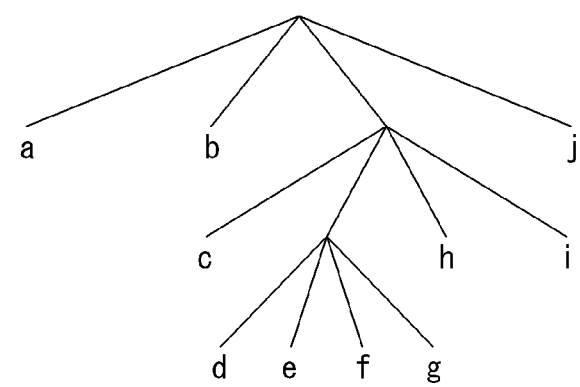
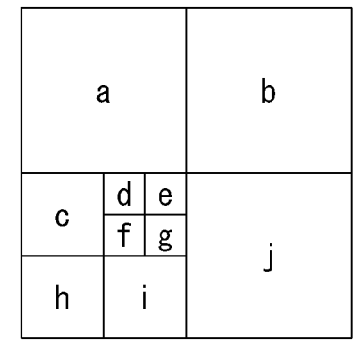
(A)　　　　　　　　　(B)

[Fig. 4]
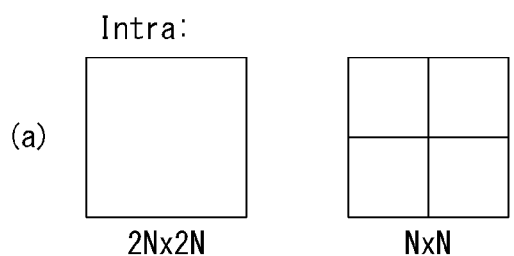
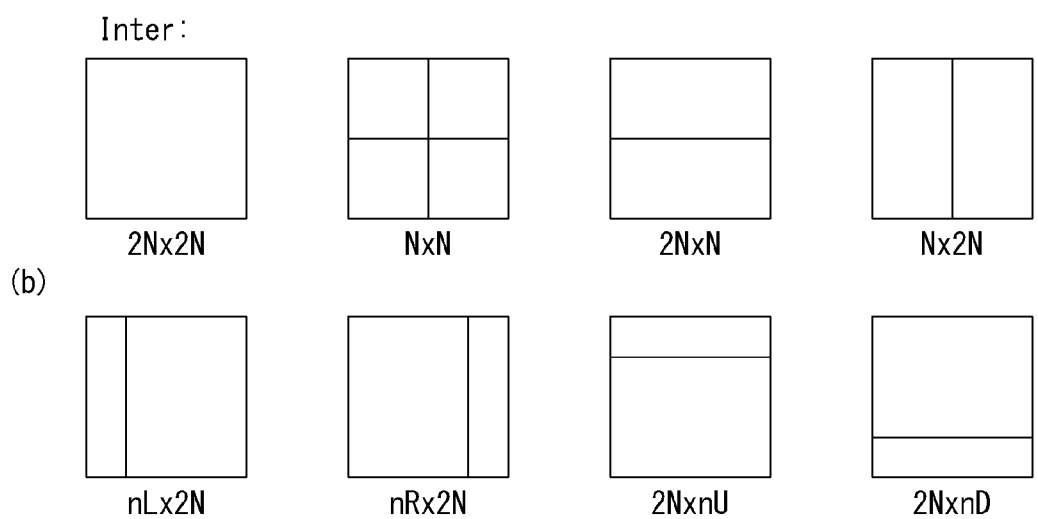

【Fig. 5】

| A<br>-1,-1 | | | | A<br>0,-1 | a<br>0,-1 | b<br>0,-1 | c<br>0,-1 | A<br>1,-1 | | | | A<br>2,-1 |
|---|---|---|---|---|---|---|---|---|---|---|---|---|
| | | | | | | | | | | | | |
| | | | | | | | | | | | | |
| | | | | | | | | | | | | |
| A<br>-1,0 | | | | A<br>0,0 | a<br>0,0 | b<br>0,0 | c<br>0,0 | A<br>1,0 | | | | A<br>2,0 |
| d<br>-1,0 | | | | d<br>0,0 | e<br>0,0 | f<br>0,0 | g<br>0,0 | d<br>1,0 | | | | d<br>2,0 |
| h<br>-1,0 | | | | h<br>0,0 | i<br>0,0 | j<br>0,0 | k<br>0,0 | h<br>1,0 | | | | h<br>2,0 |
| n<br>-1,0 | | | | n<br>0,0 | p<br>0,0 | q<br>0,0 | r<br>0,0 | n<br>1,0 | | | | n<br>2,0 |
| A<br>-1,1 | | | | A<br>0,1 | a<br>0,1 | b<br>0,1 | c<br>0,1 | A<br>1,1 | | | | A<br>2,1 |
| | | | | | | | | | | | | |
| | | | | | | | | | | | | |
| | | | | | | | | | | | | |
| A<br>-1,2 | | | | A<br>0,2 | a<br>0,2 | b<br>0,2 | c<br>0,2 | A<br>1,2 | | | | A<br>2,2 |

[Fig. 6]
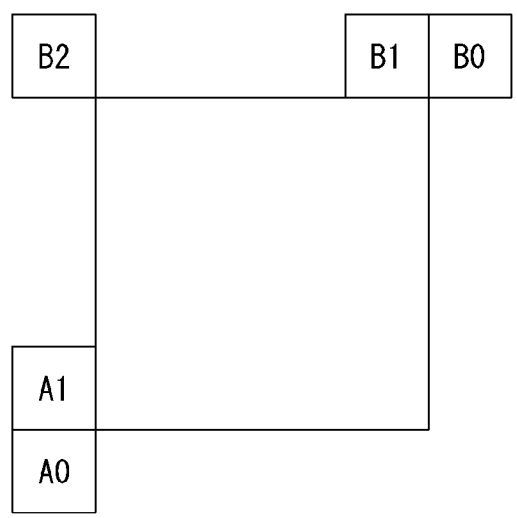

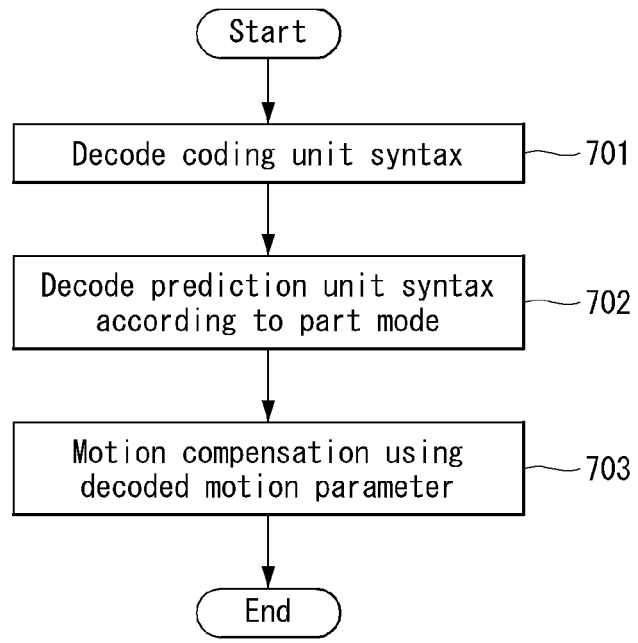
[Fig. 7]

[Fig. 8]
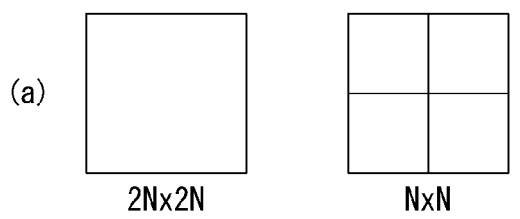
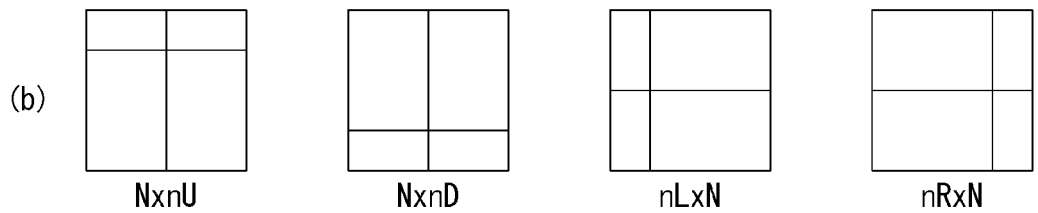

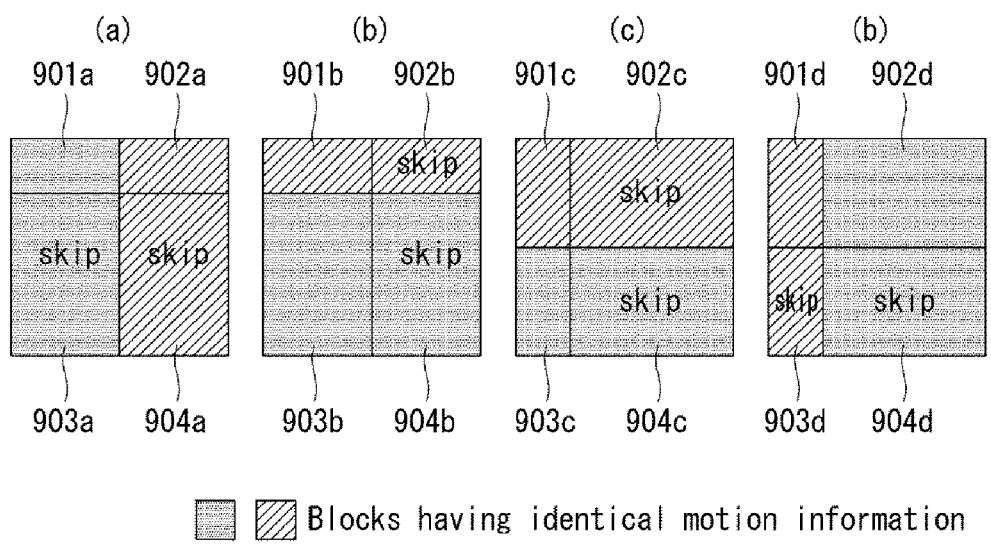
[Fig. 9]

[Fig. 10]
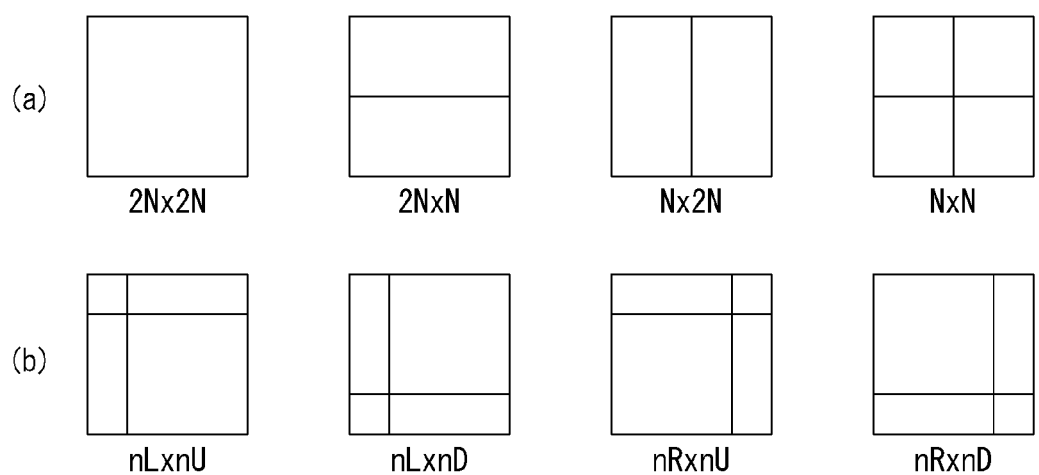

[Fig. 11]
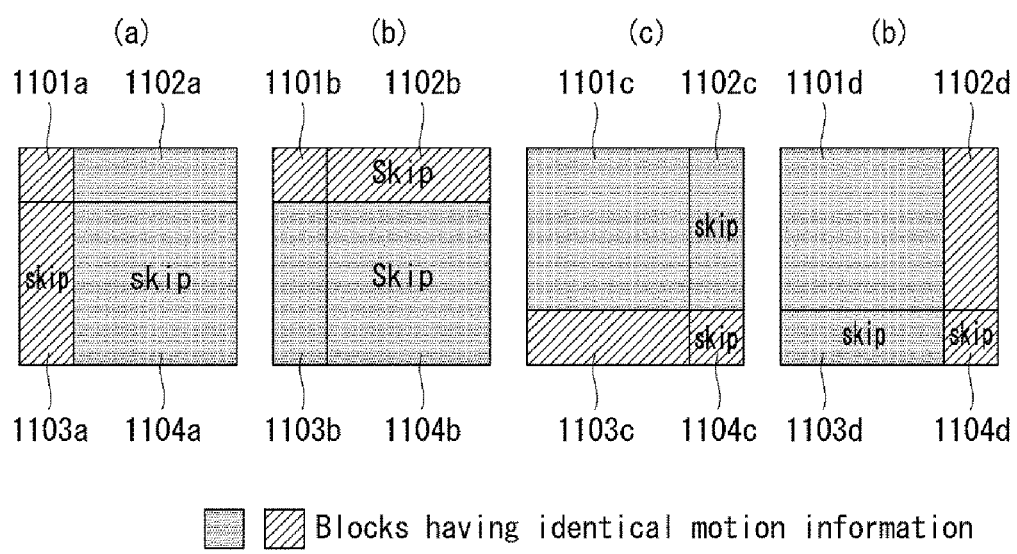

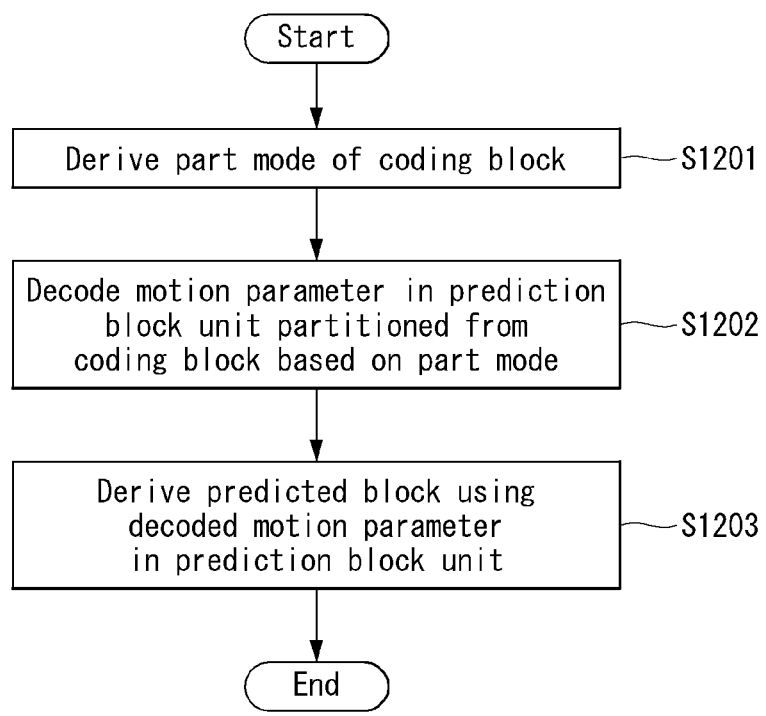
[Fig. 12]

[Fig. 13]
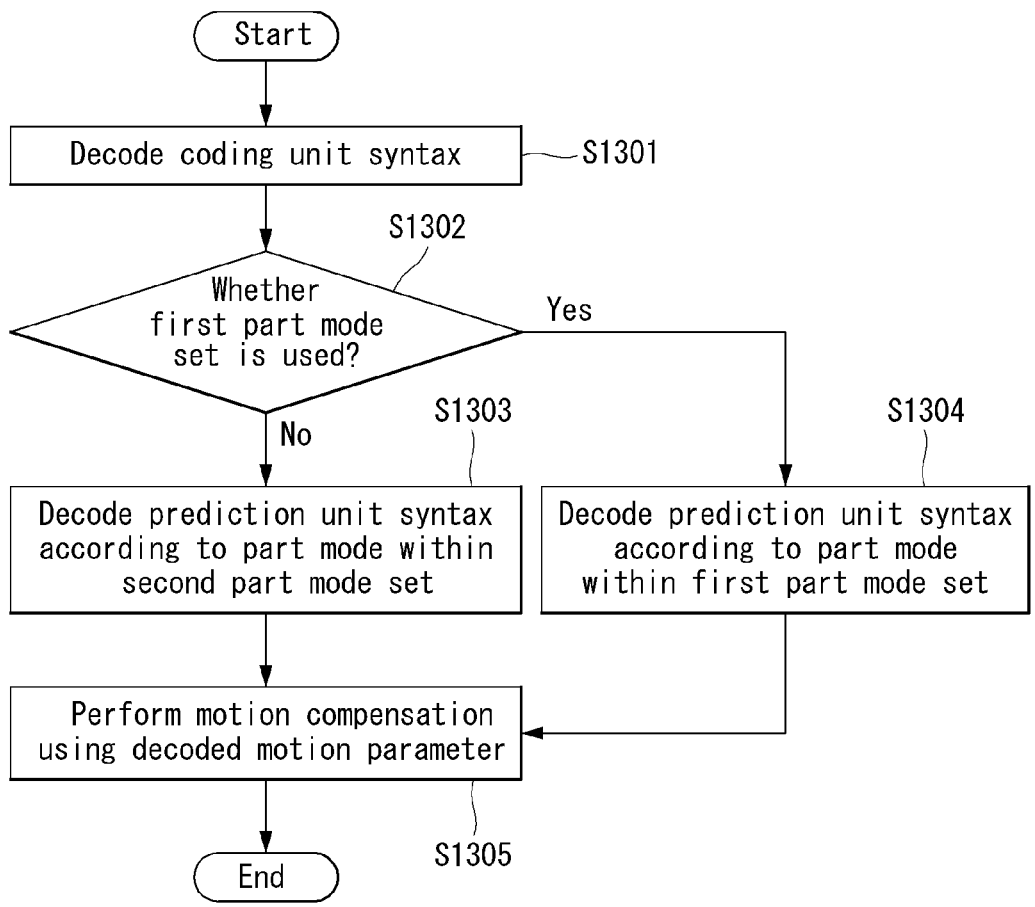

[Fig. 14]
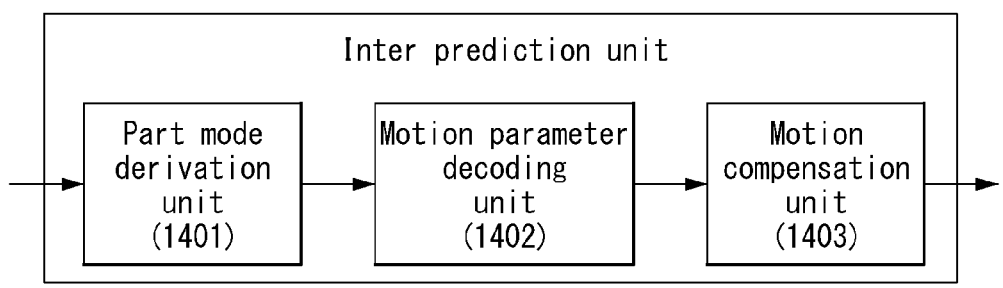

METHOD FOR ENCODING/DECODING IMAGE AND DEVICE THEREFOR

CROSS-REFERENCE TO RELATED APPLICATIONS

This application is the National Stage filing under 35 U.S.C. 371 of International Application No. PCT/KR2016/011943, filed on Oct. 24, 2016, which claims the benefit of U.S. Provisional Application No. 62/245,256, filed on Oct. 22, 2015 the contents of which are all hereby incorporated by reference herein in their entirety.

TECHNICAL FIELD

The present invention relates to a still image or moving image processing method and, more particularly, to a method of encoding/decoding a moving image based on an asymmetrical partition form and an apparatus supporting the same.

BACKGROUND ART

Compression encoding means a series of signal processing techniques for transmitting digitized information through a communication line or techniques for storing information in a form suitable for a storage medium. Media, such as a picture, an image and audio, may be a target for compression encoding, and particularly, a technique for performing compression encoding on a picture is referred to as video image compression.

Next-generation video content is supposed to have the characteristics of high spatial resolution, a high frame rate and high dimensionality of scene representation. In order to process such content, a drastic increase in the memory storage, memory access rate and processing power will result.

Accordingly, it is required to design a coding tool for processing next-generation video contents efficiently.

DISCLOSURE

Technical Problem

An object of the present invention is to propose a method of partitioning a block in an asymmetrical form in a block partition process when encoding/decoding an image.

Specifically, an object of the present invention is to propose a method of partitioning a block in an asymmetrical 4-block partition form in a block partition process for inter-picture prediction (inter prediction).

Technical objects to be achieved by the present invention are not limited to the aforementioned technical objects, and other technical objects not described above may be evidently understood by a person having ordinary skill in the art to which the present invention pertains from the following description.

Technical Solution

In an aspect of the present invention, a method for a decoding apparatus to decode an image includes deriving a part mode of a coding block within a predefined part mode set, decoding a motion parameter in a prediction block unit partitioned from the coding block based on the part mode, and generating a predicted block using the decoded motion parameter in the prediction block unit. The part mode set may include an asymmetrical 4-block part mode. In the asymmetrical 4-block part mode, the coding block may be partitioned into four prediction blocks, and at least one of a horizontal partition and a vertical partition is defined in an asymmetrical partition form.

In another aspect of the present invention, includes a part mode derivation unit deriving a part mode of a coding block within a predefined part mode set, a motion parameter decoding unit decoding a motion parameter in a prediction block unit partitioned from the coding block based on the part mode, and a motion compensation unit generating a predicted block using the decoded motion parameter in the prediction block unit. The part mode set may include an asymmetrical 4-block part mode. In the asymmetrical 4-block part mode, the coding block may be partitioned into four prediction blocks, and at least one of a horizontal partition and a vertical partition may be defined in an asymmetrical partition form.

Preferably, the motion parameter of the prediction block generated based on the asymmetrical 4-block part mode may be derived from a motion parameter of another neighboring prediction block within the coding block.

Preferably, the asymmetrical 4-block part mode may include N×nU, N×nD, nL×N, and nR×N.

Preferably, the asymmetrical 4-block part mode may include nL×nU, nL×nD, nR×nU, and nR×nD.

Preferably, a flag indicating whether the part mode set includes the asymmetrical 4-block part mode may be decoded.

Preferably, when the flag indicates that the part mode set does not include the asymmetrical 4-block part mode, the part mode set may include 2N×2N, N×N, 2N×N, N×2N, nL×2N, nR×2N, 2N×nU, and 2N×nD.

Preferably, the flag may be transmitted in any one unit of a coding block, a slice, and a picture.

Advantageous Effects

In accordance with an embodiment of the present invention, an increase of the bit rate can be suppressed by preventing a case where an image is partitioned in a small unit because the image is partitioned into an asymmetrical block.

Furthermore, in accordance with an embodiment of the present invention, the amount of a residual signal is reduced and overall improvement of encoding efficiency can be expected because efficiency of inter-picture prediction can be improved by partitioning an image into asymmetrical blocks.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 is illustrates a schematic block diagram of an encoder in which the encoding of a still image or video signal is performed, as an embodiment to which the present invention is applied.

FIG. 2 illustrates a schematic block diagram of a decoder in which decoding of a still image or video signal is performed, as an embodiment to which the present invention is applied.

FIG. 3 is a diagram for describing a split structure of a coding unit that may be applied to the present invention.

FIG. 4 is a diagram for describing a prediction unit that may be applied to the present invention.

FIG. 5 is an embodiment to which the present invention may be applied and illustrates integer and factional sample positions for ¼ sample interpolation.

FIG. 6 is an embodiment to which the present invention may be applied and illustrates the positions of spatial candidates.

FIG. 7 is an embodiment to which the present invention may be applied and is a diagram illustrating an inter prediction method.

FIG. 8 illustrates block partition forms including asymmetrical 4-block partitions according to an embodiment of the present invention.

FIG. 9 illustrates a case where skip modes are applied in asymmetrical 4-block partition forms according to an embodiment of the present invention.

FIG. 10 illustrates block partition forms including asymmetrical 4-block partitions according to an embodiment of the present invention.

FIG. 11 illustrates a case where skip modes are applied in asymmetrical 4-block partition forms according to an embodiment of the present invention.

FIG. 12 is a diagram illustrating an image decoding method according to an embodiment of the present invention.

FIG. 13 is a diagram illustrating an image decoding method according to an embodiment of the present invention.

FIG. 14 is a diagram illustrating an inter prediction unit according to an embodiment of the present invention.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc. may be properly replaced and interpreted in each coding process.

In the present description, a "block" or "unit" refers to a unit of performing an encoding/decoding process such as prediction, transformation and/or quantization and may be composed of multi-dimension arrangement of samples (or pixels).

A "block" or "unit" may refer to multi-dimension arrangement of samples with respect to a luma component or multi-dimension arrangement of samples with respect to a chroma component. In addition, a "block" or "unit" may commonly refer to multi-dimension arrangement of samples with respect to a luma component and multi-dimension arrangement of samples with respect to a chroma component.

For example, a "block" or "unit" can be interpreted as the meaning including a coding block (CB) which refers to arrangement of samples to be encoded/decoded, a coding tree block (CTB) composed of a plurality of coding blocks, a prediction block (PB) (or prediction unit (PU)) which refers to arrangement of samples to which the same prediction is applied, and a transform block (TB) (or transform unit (TU)) which refers to arrangement of samples to which the same transformation is applied.

Furthermore, a "block" or "unit" may be interpreted as the meaning including a syntax structure used in a process of encoding/decoding arrangement of samples with respect to a luma component and/or a chroma component unless otherwise mentioned. Here, the syntax structure refers to 0 or more syntax elements present in a bitstream in a specific order, and a syntax element refers to a data element represented in a bitstream.

For example, a "block" or "unit" can be interpreted as the meaning including a coding unit (CU) including a coding block and a syntax structure used for encoding of the coding block, a coding tree unit composed of a plurality of coding units, a prediction unit (PU) including a prediction block and a syntax structure used for prediction of the prediction block, and a transform unit (TU) including a transform block and a syntax structure used for transformation of the transform block.

In addition, in the present description, a "block" or "unit" is not limited to arrangement of samples (or pixels) in a square or rectangular form and may refer to arrangement of samples (or pixels) in a polygonal form having three or more vertexes. In this case, it may be referred to as a polygon block or a polygon unit.

FIG. 1 is illustrates a schematic block diagram of an encoder in which the encoding of a still image or video signal is performed, as an embodiment to which the present invention is applied.

Referring to FIG. 1, the encoder 100 may include a video partition unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter prediction unit 181 and an intra prediction unit 182.

The video partition unit 110 partitions an input video signal (or picture or frame), input to the encoder 100, into one or more blocks.

The subtractor 115 generates a residual signal (or residual block) by subtracting a predicted signal (or predicted block), output by the prediction unit 180 (i.e., by the inter prediction unit 181 or the intra prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequatization and inverse transformation to the quantized signal through the dequantization unit 140 and the inverse transform unit 150. A reconstructed signal (or reconstructed block) may be generated by adding the reconstructed residual signal to the prediction signal output by the inter prediction unit 181 or the intra prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter prediction unit 181. As described above, an encoding rate as well as image quality can be improved using the filtered picture as a reference picture in an inter picture prediction mode.

The decoded picture buffer 170 may store the filtered picture in order to use it as a reference picture in the inter prediction unit 181.

The inter prediction unit 181 performs temporal prediction and/or spatial prediction with reference to the reconstructed picture in order to remove temporal redundancy and/or spatial redundancy.

In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter prediction unit 181 may perform prediction by generating an interpolation pixel by applying the interpolation filter to the integer pixel and by using the interpolated block including interpolated pixels.

The intra prediction unit 182 predicts a current block with reference to samples neighboring the block that is now to be encoded. The intra prediction unit 182 may perform the following procedure in order to perform intra prediction. First, the intra prediction unit 182 may prepare a reference sample necessary to generate a predicted signal (or predicted block). Furthermore, the intra prediction unit 182 may generate a prediction signal using the prepared reference sample. Next, the intra prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra prediction.

The predicted signal (or predicted block) generated through the inter prediction unit 181 or the intra prediction unit 182 may be used to generate a reconstructed signal (or reconstructed block) or may be used to generate a residual signal (or residual block).

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter prediction unit 261 and an intra prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the predicted signal (or predicted block) output by the prediction unit 260 (i.e., the inter prediction unit 261 or the intra prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter prediction unit 261.

In this specification, the embodiments described in the filtering unit 160, inter prediction unit 181 and intra prediction unit 182 of the encoder 100 may be identically applied to the filtering unit 240, inter prediction unit 261 and intra prediction unit 262 of the decoder, respectively.

Block Partition Structure

In general, a block-based image compression method is used in the compression technique (e.g., HEVC) of a still image or a video. The block-based image compression method is a method of processing an image by splitting it into specific block units, and may decrease memory use and a computational load.

FIG. 3 is a diagram for describing a partition structure of a coding unit which may be applied to the present invention.

An encoder partitions a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be partitioned in a quad-tree structure. That is, one CTU may be partitioned into four units each having a square form and having a half horizontal size and a half vertical size, thereby being capable of generating coding units (CUs). Such splitting of the quad-tree structure may be recursively performed. That is, the CUs are hierarchically partitioned from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is partitioned until a leaf node is reached. The leaf node corresponds to a CU.

This is described in more detail. The CTU corresponds to the root node and has the smallest depth (i.e., depth=0) value. A CTU may not be partitioned depending on the characteristics of an input video signal. In this case, the CTU corresponds to a CU.

A CTU may be partitioned in a quad-tree form. As a result, lower nodes, that is, a depth 1 (depth=1), are generated. Furthermore, a node (i.e., leaf node) that belongs to the lower nodes having the depth of 1 and that is no longer partitioned corresponds to a CU. For example, in FIG. 3(b), a CU(a), a CU(b) and a CU(j) corresponding to nodes a, b and j have been once partitioned from the CTU, and have a depth of 1.

At least one of the nodes having the depth of 1 may be partitioned in a quad-tree form. As a result, lower nodes having a depth 1 (i.e., depth=2) are generated. Furthermore, a node (i.e., leaf node) that belongs to the lower nodes having the depth of 2 and that is no longer partitioned corresponds to a CU. For example, in FIG. 3(b), a CU(c), a CU(h) and a CU(i) corresponding to nodes c, h and i have been twice partitioned from the CTU, and have a depth of 2.

Furthermore, at least one of the nodes having the depth of 2 may be partitioned in a quad-tree form again. As a result, lower nodes having a depth 3 (i.e., depth=3) are generated. Furthermore, a node (i.e., leaf node) that belongs to the lower nodes having the depth of 3 and that is no longer partitioned corresponds to a CU. For example, in FIG. 3(b), a CU(d), a CU(e), a CU(f) and a CU(g) corresponding to nodes d, e, f and g have been three times partitioned from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically partitioned with predetermined maximum depth information (or maximum level information). Furthermore, each partition CU may have depth information. Since the depth information represents a partition count and/or degree of a CU, it may include information about the size of a CU.

Since the LCU is partitioned in a quad-tree form, the size of SCU may be obtained by using a size of LCU and the maximum depth information. Or, inversely, the size of LCU may be obtained by using a size of SCU and the maximum depth information of the tree.

For a single CU, the information (e.g., a partition CU flag (split_cu_flag)) that represents whether the corresponding CU is partitioned may be forwarded to the decoder. This partition information is included in all CUs except the SCU. For example, when the value of the flag that represents whether to partitioned is '1', the corresponding CU is further partitioned into four CUs, and when the value of the flag indicating whether to partition the corresponding CU is '0', the corresponding CU is no longer split, and the processing process for the corresponding CU may be performed.

As described above, a CU is a basic unit of the coding in which the intra prediction or the inter prediction is performed. The HEVC partitions the CU in a prediction unit (PU) for coding an input video signal more effectively.

A PU is a basic unit for generating a prediction block, and even in a single CU, the prediction block may be generated in different way by a unit of PU. However, the intra prediction and the inter prediction are not used together for the PUs that belong to a single CU, and the PUs that belong to a single CU are coded by the same prediction method (i.e., the intra prediction or the inter prediction).

A PU is not partitioned in a quad-tree structure, but is partitioned once in a single CU in a predetermined form. This will be described by reference to the drawing below.

FIG. 4 is a diagram for describing a prediction unit that may be applied to the present invention.

A PU is differently partitioned depending on whether the intra prediction mode is used or the inter prediction mode is used as the coding mode of the CU to which the PU belongs.

FIG. 4(a) illustrates a PU if the intra prediction mode is used, and FIG. 4(b) illustrates a PU if the inter prediction mode is used.

Referring to FIG. 4(a), assuming that the size of a single CU is 2N×2N (N=4, 8, 16 and 32), the single CU may be partitioned into two types (i.e., 2N×2N or N×N).

In this case, if a single CU is partitioned into the PU of a 2N×2N form, it means that only one PU is present in a single CU.

Meanwhile, if a single CU is partitioned into the PU of an N×N form, a single CU is partitioned into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be partitioned into eight PU types (i.e., 2N×2N, N×N, 2N×N, N×2N, nL×2N, nR×2N, 2N×nU and 2N×nD)

As in the intra prediction, the PU partition of an N×N form may be performed only if the size of CB for the luma component of CU is the minimum size (i.e., the case that a CU is an SCU).

The inter prediction supports the PU partition in the form of 2N×N that is partition in a horizontal direction and in the form of N×2N that is partition in a vertical direction.

In addition, the inter prediction supports the PU partition in the form of nL×2N, nR×2N, 2N×nU and 2N×nD, which is an asymmetric motion partition (AMP). In this case, 'n' means ¼ value of 2N. However, the AMP may not be used if the CU to which the PU is belonged is the CU of minimum size.

In order to encode the input video signal in a single CTU efficiently, the optimal partition structure of the coding unit (CU), the prediction unit (PU) and the transform unit (TU) may be determined based on a minimum rate-distortion value through the processing process as follows. For example, as for the optimal CU partition process in a 64×64 CTU, the rate-distortion cost may be calculated through the partition process from a CU of 64×64 size to a CU of 8×8 size. The detailed process is as follows.

1) The optimal partition structure of a PU and TU that generates the minimum rate distortion value is determined by performing inter/intra prediction, transformation/quantization, dequantization/inverse transformation and entropy encoding on the CU of 64×64 size.

2) The optimal partition structure of a PU and TU is determined to partition the 64×64 CU into four CUs of 32×32 size and to generate the minimum rate distortion value for each 32×32 CU.

3) The optimal partition structure of a PU and TU is determined to further partition the 32×32 CU into four CUs of 16×16 size and to generate the minimum rate distortion value for each 16×16 CU.

4) The optimal partition structure of a PU and TU is determined to further partition the 16×16 CU into four CUs of 8×8 size and to generate the minimum rate distortion value for each 8×8 CU.

5) The optimal partition structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal partition structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal partition structure of CU in the 64×64 block is determined by comparing the rate-distortion value of the 64×64 CU obtained in the process 1) with the addition of the rate-distortion value of the four 32×32 CUs obtained in the process 6).

In the intra prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is partition in a quad-tree structure to generate a CU, a TU is hierarchically partitioned from one CU to be coded in the quad-tree structure.

TUs partitioned from a CU may be partitioned into smaller and lower TUs because a TU is partitioned in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is partitioned until a leaf node is reached, and the leaf node corresponds to a TU.

This is described in more detail. A CU corresponds to a root node and has the smallest depth (i.e., depth=0) value. A CU may not be partitioned depending on the characteristics of an input image. In this case, the CU corresponds to a TU.

A CU may be partitioned in a quad-tree form. As a result, lower nodes having a depth 1 (depth=1) are generated. Furthermore, a node (i.e., leaf node) that belongs to the lower nodes having the depth of 1 and that is no longer partitioned corresponds to a TU. For example, in FIG. 3(b), a TU(a), a TU(b) and a TU(j) corresponding to the nodes a, b and j are once partitioned from a CU and have a depth of 1.

At least one of the nodes having the depth of 1 may be partitioned in a quad-tree form again. As a result, lower nodes having a depth 2 (i.e., depth=2) are generated. Furthermore, a node (i.e., leaf node) that belongs to the lower nodes having the depth of 2 and that is no longer partitioned corresponds to a TU. For example, in FIG. 3(b), a TU(c), a TU(h) and a TU(i) corresponding to the node c, h and I have been partitioned twice from the CU and have the depth of 2.

Furthermore, at least one of the nodes having the depth of 2 may be partitioned in a quad-tree form again. As a result, lower nodes having a depth 3 (i.e., depth=3) are generated. Furthermore, a node (i.e., leaf node) that belongs to the lower nodes having the depth of 3 and that is no longer partitioned corresponds to a CU. For example, in FIG. 3(b), a TU(d), a TU(e), a TU(f) and a TU(g) corresponding to the nodes d, e, f and g have been three times partitioned from the CU and have the depth of 3.

A TU having a tree structure may be hierarchically partitioned with predetermined maximum depth information (or maximum level information). Furthermore, each spit TU may have depth information. The depth information may include information about the size of the TU because it indicates the partition number and/or degree of the TU.

Information (e.g., a partition TU flag "split_transform_flag") indicating whether a corresponding TU has been partitioned with respect to one TU may be transferred to the decoder. The partition information is included in all of TUs other than a TU of a minimum size. For example, if the value of the flag indicating whether a TU has been partitioned is "1", the corresponding TU is partitioned into four TUs. If the value of the flag indicating whether a TU has been partitioned is "0", the corresponding TU is no longer split.

Prediction

In order to reconstruct a current processing unit on which decoding is performed, a current picture or a decoded part of other pictures including a current processing unit may be used.

A picture (slice) using only a current picture for reconstruction, that is, on which only intra prediction is performed, may be called an intra picture or a I picture (slice), a picture (slice) using a maximum of one motion vector and one reference index so as to predict each unit may be called a predictive picture or a P picture (slice), and a picture (slice)

using a maximum of two motion vectors and reference indices so as to predict each unit may be called a bi-predictive picture or a B picture (slice).

Intra prediction means a prediction method of deriving a current processing block from the data element (e.g., sample value) of the same decoded picture (or slice). That is, intra prediction means a method of predicting the pixel value of a current processing block with reference to reconstructed regions within a current picture.

Inter prediction is described in detail below.

Inter Prediction (or Inter-Frame Prediction)

Inter prediction means a prediction method of deriving a current processing block based on the data element (e.g., sample value or motion vector) of a picture other than a current picture. That is, inter prediction means a method of predicting the pixel value of a current processing block with reference to reconstructed regions within a reconstructed another picture other than a current picture.

Which reference region (or reference block) is used to predict a current block in an inter-frame prediction process may be indicated using an index (i.e., a reference picture index or a reference index) and motion vector information indicative of a reference picture including a corresponding reference region.

Inter prediction may include forward direction prediction, backward direction prediction, and bi-prediction. The forward direction prediction means prediction using one reference picture displayed (or output) temporally anterior to a current picture. The backward direction prediction means prediction using one reference picture displayed (or output) temporally posterior to a current picture. To this end, one piece of motion information (e.g., motion vector information, a reference picture index and/or the identifier of a reference picture list associated with each reference picture index) may be necessary.

In the bi-prediction method, a maximum of two reference regions may be used. The two reference regions may be present in the same reference picture or may be present in different pictures. That is, in the bi-prediction method, a maximum of pieces of two motion information (e.g., motion vector information, a reference picture index and/or the identifier of a reference picture list associated with each reference picture index) may be used. Two motion vectors may have the same reference picture index or may have different reference picture indices. In this case, the reference pictures may be displayed (or output) temporally anterior to a current picture or may be displayed (or output) posterior to a current picture.

Motion information of a current processing block may include motion vector information, a reference picture index and/or the identifier of a reference picture list associated with each reference picture index. The motion vector information may include a motion vector, a motion vector predictor (MVP) or a motion vector difference (MVD). The motion vector difference means a difference value between the motion vector and the motion vector predictor.

The encoder performs motion estimation for finding a reference region most similar to a current processing block from reference pictures in an inter prediction process. Furthermore, the encoder may provide the decoder with motion vector information about a reference region, a reference picture index and/or the identifier of a reference picture list associated with each reference picture index.

The encoder/decoder may obtain the reference region of a current processing block using motion vector information, a reference picture index and/or the identifier of a reference picture list associated with each reference picture index. The reference region is present in a reference picture having the reference picture index. Furthermore, the pixel value or interpolated value of a reference region specified by the motion vector may be used as the predictor of the current processing block. That is, motion compensation for predicting an image of a current processing block from a previously decoded picture is performed using motion information (e.g., motion vector information, a reference picture index and/or the identifier of a reference picture list associated with each reference picture index).

In order to reduce the amount of transmission related to such motion vector information, a method of obtaining a motion vector predictor "mvp" using motion information of previously coded blocks and transmitting only a corresponding difference "mvd" may be used. That is, the decoder obtains the motion vector predictor of a current processing block using motion information of decoded other blocks and obtains the motion vector value of the current processing block using the difference transmitted by the encoder. In obtaining the motion vector predictor, the decoder may obtain various motion vector candidate values using motion information of already decoded other blocks, and may obtain one of the various motion vector candidate values as the motion vector predictor.

Reference Picture Set and Reference Picture List

In order to manage multiple reference pictures, a set of a previously decoded picture is stored in the decoding picture buffer (DPB) for the decoding of remaining pictures.

A reconstructed picture that belongs to the reconstructed pictures stored in the DPB and that is used for inter prediction is referred to as a "reference picture." In other words, the reference picture means a picture including a sample that may be used for inter prediction in the decoding process of a next picture in the decoding sequence.

A reference picture set (RPS) means a set of reference pictures associated with a picture, and includes all of pictures previously associated in the decoding sequence. The reference picture set may be used for the inter prediction of an associated picture or a picture that follows an associated picture in the decoding sequence. That is, reference pictures maintained in the decoding picture buffer (DPB) may be referred to as a "reference picture set." The encoder may provide the decoder with reference picture set information in a sequence parameter set (SPS) (i.e., a syntax structure including a syntax element) or each slice header.

A reference picture list means a list of reference pictures used for the inter prediction of a P picture (or slice) or a B picture (or slice). In this case, the reference picture list may be divided into two reference picture lists, which may be referred to as a "reference picture list 0 (or L0)" and a "reference picture list 1 (or L1)." Furthermore, a reference picture belonging to the reference picture list 0 may be referred to as a "reference picture 0 (or L0 reference picture)", and a reference picture belonging to the reference picture list 1 may be referred to as a "reference picture 1 (or L1 reference picture)."

In the decoding process of a P picture (or slice), a single reference picture list (i.e., reference picture list 0) may be used. In the decoding process of a B picture (or slice), two reference picture lists (i.e., a reference picture list 0 and a reference picture list 1) may be used. Information for classifying a reference picture list for each reference picture may be provided to the decoder through reference picture set information. The decoder adds a reference picture to the reference picture list 0 or the reference picture list 1 based on the reference picture set information.

A reference picture index (or reference index) is used to identify any one specific reference picture within a reference picture list.

Fractional Sample Interpolation

A sample of a prediction block for an inter-predicted current processing block is obtained from the sample value of a corresponding reference region within a reference picture identified by a reference picture index. In this case, the corresponding reference region within the reference picture indicates a region at the positioned indicated by the horizontal component and vertical component of a motion vector. Fractional sample interpolation is used to generate a prediction sample for noninteger sample coordinates other than a case where a motion vector has an integer value. For example, a motion vector of a ¼ unit of the distance between samples may be supported.

In the case of HEVC, in the fractional sample interpolation of a luma component, an 8-tap filter is applied in a traverse direction and a longitudinal direction. Furthermore, in the fractional sample interpolation of a chroma component, a 4-tap filter is applied in a traverse direction and a longitudinal direction.

FIG. 5 is an embodiment to which the present invention may be applied and illustrates integer and factional sample positions for ¼ sample interpolation.

Referring to FIG. 5, a shadow block in which an upper-case letter (A_i,j) is written indicates an integer sample position, and a block in which a lower-case letter (x_i,j) is written and that does not have a shadow indicates a fractional sample position.

A fractional sample is generated by applying an interpolation filter to an integer sample value in a horizontal direction and a vertical direction. For example, in the case of the horizontal direction, an 8-tap filter may be applied to four integer sample values on the left side of a fractional sample to be generated and four integer sample values on the right side of the fractional sample.

Inter Prediction Mode

In HEVC, in order to reduce the amount of motion information, a merge mode or advanced motion vector prediction (AMVP) may be used.

1) Merge Mode

The merge mode means a method of deriving motion information from a block that neighbors spatially or temporally. In this case, motion information may include a horizontal and vertical motion vector value, one or more reference picture indices, and the identifier of a reference picture list associated with each reference picture index.

That is, the encoder configures a merge candidate list, and signals candidate block information selected in the merge candidate list to the decoder as a merge index (e.g., merge_idx[x0][y0]') by performing motion estimation. The decoder configures a merge candidate list like the encoder, and derives motion information about a current prediction block from the merge candidate list based on motion information of a candidate block corresponding to a merge index received from the encoder. Furthermore, the decoder generates the prediction block of the current processing block based on the derived motion information (i.e., motion compensation).

A set of candidates available in a merge mode includes spatial neighbor candidates, temporal candidates, and generated candidates.

FIG. 6 is an embodiment to which the present invention may be applied and illustrates the positions of spatial candidates.

Referring to FIG. 6, whether each spatial candidate block is available according to a sequence of {a1, b1, b0, a0, b2} is determined. In this case, if a candidate block is encoded in an intra prediction mode and there is no motion information or if a candidate block is located outside a current picture (or slice), the corresponding candidate block cannot be used.

After the validity of spatial candidates is determined, a spatial merge candidate may be configured by excluding an unnecessary candidate block from the candidate block of a current processing block. For example, if the candidate block of a current prediction block is a first prediction block within the same coding block, candidate blocks having the same motion information other than the corresponding candidate block may be excluded.

When the spatial merge candidate configuration is completed, a temporal merge candidate configuration process is performed.

In the temporal candidate configuration, if the right bottom block of a collocated block of a reference picture is available, the corresponding block is configured as a temporal merge candidate. The collocated block means a block at a position corresponding to a current processing block in a selected reference picture. In contrast, if not, a block located at the center of the collocated block may be configured as a temporal merge candidate.

A maximum number of merge candidates may be specified in a slice header. If the number of merge candidates is greater than a maximum number, spatial candidates and temporal candidates having a number smaller than the maximum number are maintained. If not, in the number of merge candidates, additional merge candidates (i.e., combined bi-predictive merging candidates) are generated by combining candidates added up to now until the number of candidates becomes a maximum number.

2) Advanced Motion Vector Prediction (AMVP) Mode

The AMVP mode means a method of deriving a motion vector predictor from a neighbor block. Accordingly, a horizontal and vertical motion vector difference (MVD), a reference picture index, and the identifier of a reference picture list associated with each reference picture index are signaled to the decoder. A horizontal and vertical motion vector value is calculated using a derived motion vector predictor and a motion vector difference (MVD) provided by the encoder.

That is, the encoder configures a motion vector predictor candidate list, and signals a motion reference flag (i.e., candidate block information) (e.g., mvp_lX_flag[x0][y0]'), selected in the motion vector predictor candidate list, to the decoder by performing motion estimation. The decoder configures a motion vector predictor candidate list like the encoder, and derives the motion vector predictor of a current processing block using motion information of a candidate block indicated in a motion reference flag received from the encoder in the motion vector predictor candidate list. Furthermore, the decoder obtains the motion vector value of the current processing block using the derived motion vector predictor and a motion vector difference received from the encoder. Furthermore, the decoder generates the prediction block of the current processing block based on the derived motion information (i.e., motion compensation).

In the case of the AMVP mode, two spatial motion candidates of five available candidates in FIG. 6 are selected. The first spatial motion candidate is selected from a {a0, a1} set located on the left side, and the second spatial motion candidate is selected from a {b0, b1, b2} set located at the top. In this case, if the reference index of a neighbor candidate block is not the same as a current prediction block, a motion vector is scaled.

If the number of selected candidates is 2 as a result of the search of spatial motion candidates, a candidate configuration is terminated. If the number of selected candidates is less than 2, a temporal motion candidate is added.

As described above, in video coding, an inter-picture prediction (or inter prediction) scheme is performed through motion estimation/compensation. One image is partitioned in a small unit, and motion estimation/compensation is applied. In this case, a partitioned unit is called a block (or a processing block), and each block may be partitioned in a smaller unit in order to increase precision of prediction.

Motion compensation is performed on each partitioned block through a reference list, a reference list index, and a motion vector. If a 2N×2N block is partitioned into four N×N blocks, each N×N block becomes another unit block and may be recursively partitioned.

As described above, as a block is partitioned, motion prediction is performed in a small unit, thereby improving inter-picture prediction performance. However, the bit rate is increased because motion information and partition information about each partitioned region are transmitted. Accordingly, high encoding efficiency may be expected if proper partitioning is performed.

FIG. 7 is an embodiment to which the present invention may be applied and is a diagram illustrating an inter prediction method.

Referring to FIG. 7, the encoder/decoder (specifically, the inter prediction unit 181 of the encoder in FIG. 1 and the inter prediction unit 261 of the decoder in FIG. 2) decodes a coding unit syntax (S701).

Table 1 illustrates the syntax of a coding unit level.

Referring to Table 1, in the decoding process "coding_unit(x0, y0, log 2CbSize)" of a coding unit, the position (x0, y0) of the coding unit and the size (log 2CbSize) of the coding unit are invoked as inputs. In this case, x0, y0 indicates a relative position from the top-left sample of a current picture to the top-left sample of a current coding unit. Furthermore, log 2CbSize indicates the size of the current coding unit.

The encoder/decoder decodes the prediction unit syntax according to a part mode "PartMode" (S702).

That is, the position where each prediction block is partitioned is defined based on the part mode "PartMode" of a prediction block.

Referring to Table 1, in the decoding process "prediction_unit(x0, y0, nPbW, nPbH)" of a prediction block, the position (x0', y0') of a prediction unit and the size (nPbW, nPbH) of the prediction unit are invoked as inputs. In this case, x0', y0' indicates a relative position from the top-left sample of a current picture to the top-left sample of a current prediction unit. nPbW, nPbH indicates the horizontal size and vertical size of the current prediction unit.

For example, if the part mode "PartMode" is 2N×2N, a prediction unit is the same as a coding unit. Thus, the position (x0', y0') of a prediction unit is (x0, y0), and the size (nPbW, nPbH) of a prediction unit is (nCbS, nCbS).

For another example, if the part mode "PartMode" is 2N×N, the position (x0', y0') of a first prediction unit (a top prediction unit within a coding unit) is (x0, y0) and the size (nPbW, nPbH) of a prediction unit is (nCbS, nCbS/2). Furthermore, the position (x0', y0') of a second prediction unit (a bottom prediction unit within the coding unit) is (x0, y0+(nCbS/2)) and the size (nPbW, nPbH) of the prediction unit is (nCbS, nCbS/2).

TABLE 1

| | Descriptor |
|---|---|
| ```
coding_unit( x0, y0, log2CbSize ) {
    ...
    if( PartMode = = PART_2Nx2N )
       prediction_unit( x0, y0, nCbS, nCbS )
    else if( PartMode = = PART_2NxN ) {
       prediction_unit( x0, y0, nCbS, nCbS / 2 )
       prediction_unit( x0, y0 + ( nCbS / 2 ), nCbS, nCbS / 2 )
    } else if( PartMode = = PART_Nx2N ) {
       prediction_unit( x0, y0, nCbS / 2, nCbS )
       prediction_unit( x0 + ( nCbS / 2 ), y0, nCbS / 2, nCbS )
    } else if( PartMode = = PART_2NxnU ) {
       prediction_unit( x0, y0, nCbS, nCbS / 4 )
       prediction_unit( x0, y0 + ( nCbS / 4 ), nCbS, nCbS * 3 / 4 )
    } else if( PartMode = = PART_2NxnD ) {
       prediction_unit( x0, y0, nCbS, nCbS * 3 / 4 )
       prediction_unit( x0, y0 + ( nCbS * 3 / 4 ), nCbS, nCbS / 4 )
    } else if( PartMode = = PART_nLx2N ) {
       prediction_unit( x0, y0, nCbS / 4, nCbS )
       prediction_unit( x0 + ( nCbS / 4 ), y0, nCbS * 3 / 4, nCbS )
    } else if( PartMode = = PART_nRx2N ) {
       prediction_unit( x0, y0, nCbS * 3 / 4, nCbS )
       prediction_unit( x0 + ( nCbS * 3 / 4 ), y0, nCbS / 4, nCbS )
    } else { /* PART_NxN */
       prediction_unit( x0, y0, nCbS / 2, nCbS / 2 )
       prediction_unit( x0 + ( nCbS / 2 ), y0, nCbS / 2, nCbS / 2 )
       prediction_unit( x0, y0 + ( nCbS / 2 ), nCbS / 2, nCbS / 2 )
 prediction_unit( x0 + ( nCbS / 2 ), y0 + ( nCbS / 2 ), nCbS / 2, nCbS / 2 )
    }
  }
  ...
}
``` | |

For another example, if the part mode "PartMode" is N×2N, the position (x0', y0') of a first prediction unit (a left prediction unit within a coding unit) is (x0, y0) and the size (nPbW, nPbH) of a prediction unit is (nCbS/2, nCbS). Furthermore, the position (x0', y0') of a second prediction unit (a right prediction unit within the coding unit) is (x0+(nCbS/2), y0) and the size (nPbW, nPbH) of the prediction unit is (nCbS/2, nCbS).

For another example, if the part mode "PartMode" is 2N×nU, the position (x0', y0') of a first prediction unit (a top prediction unit within a coding unit) is (x0, y0) and the size (nPbW, nPbH) of a prediction unit is (nCbS, nCbS/4). Furthermore, the position (x0', y0') of a second prediction unit (a bottom prediction unit within the coding unit) is (x0, y0+(nCbS/4)) and the size (nPbW, nPbH) of the prediction unit is (nCbS, nCbS*¾).

For another example, if the part mode "PartMode" is 2N×nD, the position (x0', y0') of a first prediction unit (a top prediction unit within a coding unit) is (x0, y0) and the size (nPbW, nPbH) of a prediction unit is (nCbS, nCbS*¾). Furthermore, the position (x0', y0') of a second prediction unit (a bottom prediction unit within the coding unit) is (x0, y0+(nCbS*¾)) and the size (nPbW, nPbH) of the prediction unit is (nCbS, nCbS/4).

For another example, if the part mode "PartMode" is nL×2N, the position (x0', y0') of a first prediction unit (a left prediction unit within a coding unit) is (x0, y0) and the size (nPbW, nPbH) of a prediction unit is (nCbS/4, nCbS). Furthermore, the position (x0', y0') of a second prediction unit (a right prediction unit within the coding unit) is (x0+(nCbS/4), y0) and the size (nPbW, nPbH) of the prediction unit is (nCbS*¾, nCbS).

For another example, if the part mode "PartMode" is nR×2N, the position (x0', y0') of a first prediction unit (a left prediction unit within a coding unit) is (x0, y0) and the size (nPbW, nPbH) of a prediction unit is (nCbS*¾, nCbS). Furthermore, the position (x0', y0') of a second prediction unit (a right prediction unit within the coding unit) is (x0+(nCbS*¾), y0) and the size (nPbW, nPbH) of the prediction unit is (nCbS/4, nCbS).

For another example, if the part mode "PartMode" is N×N, the position (x0', y0') of a first prediction unit (a top-left prediction unit within a coding unit) is (x0, y0) and the size (nPbW, nPbH) of a prediction unit is (nCbS/2, nCbS/2). Furthermore, the position (x0', y0') of a second prediction unit (a top-right prediction unit within the coding unit) is (x0+(nCbS/2), y0) and the size (nPbW, nPbH) of the prediction unit is (nCbS/2, nCbS/2). Furthermore, the position (x0', y0') of a third prediction unit (a left-bottom prediction unit within the coding unit is (x0, y0+(nCbS/2)) and the size (nPbW, nPbH) of the prediction unit is (nCbS/2, nCbS/2). Furthermore, the position (x0', y0') of a fourth prediction unit (a right-bottom prediction unit within the coding unit) is (x0+(nCbS/2), y0+(nCbS/2)) and the size (nPbW, nPbH) of the prediction unit is (nCbS/2, nCbS/2).

The encoder/decoder performs motion compensation on the prediction unit using a decoded motion parameter (or information) (S703).

Referring to Table 1, motion information for each partitioned prediction block is described in "prediction_unit(x0, y0, nPbW, nPbH)." As described above, the motion information of the current prediction unit may include motion vector information, a reference picture index and/or the identifier of a reference picture list associated with each reference picture index. That is, the encoder/decoder performs motion compensation for predicting an image of a current unit from a previously decoded picture using motion information. In other words, the encoder/decoder derives a predicted sample of a current unit from a previously decode picture.

Hereinafter, the present invention proposes methods of partitioning a block to be coded in an asymmetrical form and performing inter-picture prediction in a video encoding/decoding process.

An embodiment of the present invention proposes a method of performing 4-block partition in an asymmetrical form if a current block is partitioned in order to improve performance of motion compensation in the inter-picture prediction of video coding/decoding.

In the present invention, an asymmetrical 4-block part mode means a partition form in which a single block is partitioned into four subblocks through one horizontal partition and one vertical partition and at least one of a horizontal partition and a vertical partition is an asymmetrical partition, and may be referred to as a "different term (e.g., an asymmetric 4-motion partition)."

Hereinafter, in the description of the present invention, a case where a prediction block is partitioned from a coding block in an asymmetrical 4-block partition form as in HEVC is basically described, but the present invention is not limited thereto. That is, any block (e.g., a coding tree block, a coding block, a prediction block or a transform block) that may be defined in a block-coding/decoding method may be partitioned in the asymmetrical 4-block partition form proposed by the present invention.

FIG. 8 illustrates block partition forms including asymmetrical 4-block partitions according to an embodiment of the present invention.

Referring to FIG. 8, a coding block may be partitioned into prediction blocks of a total of 6 partition forms (part types).

As in FIG. 8(a) 2N×2N, that is, a form in which a coding block is not partitioned, and N×N, that is, a form in which a coding block is partitioned in quad-tree form, may be defined as in FIG. 4.

Furthermore, an asymmetrical 4-block partition form proposed by the present invention may be defined as in FIG. 8(b).

Referring to FIG. 8(b), in the asymmetrical 4-block partition, partitions of N×nU, N×nD, nL×N, and nR×N forms may be defined. In this case, "n" may be defined as a value different from N, and may mean a ¼ value of 2N, for example.

The asymmetrical 4-block partition forms of N×nU, N×nD, nL×N, and nR×N may have both the characteristics of the symmetrical 2-block partition forms and the characteristics of the asymmetrical 2-block partition forms illustrated in FIG. 4.

In other words, the asymmetrical 4-block partition of N×nU may have both the characteristics of the symmetrical 2 block partition of N×2N and the characteristics of the asymmetrical 2-block partition of 2N×nU. The asymmetrical 4-block partition of N×nD may have both the characteristics of the symmetrical 2 block partition of N×2N and the characteristics of the asymmetrical 2-block partition of 2N×nD. The asymmetrical 4-block partition of nL×N may have both the characteristics of the symmetrical 2 block partition of 2N×N and the characteristics of the asymmetrical 2-block partition of nL×2N. The asymmetrical 4-block partition of nR×N may have both the characteristics of the symmetrical 2 block partition of 2N×N and the characteristics of the asymmetrical 2-block partition of nR×2N. This is described with reference to the following drawing.

FIG. 9 illustrates a case where skip modes are applied in asymmetrical 4-block partition forms according to an embodiment of the present invention.

In particular, FIG. 9 illustrates a case where a skip mode may be applied to the NxnU and nLxN part types illustrated in FIG. 8.

As in FIG. 8, when a coding block is partitioned into four prediction blocks in the four asymmetrical block partition forms NxnU, NxnD, nLxN, and nRxN, the skip mode may be applied to each prediction block because each prediction block may be encoded.

In the description of the present invention, the skip mode means a prediction mode in which motion information of a spatial neighbor block is used as motion information of a current block. That is, the skip mode in the present invention may be construed as including both the skip mode and merge mode defined in HEVC.

As described above, an asymmetrical 4-block partition may have the effects of a symmetrical 2-block partition and an asymmetrical 2-block partition depending on that the skip mode is applied to a block generated as the asymmetrical 4-block partition.

FIGS. 9(a) and 9(b) illustrate cases where a coding block has been partitioned as the asymmetrical 4-block partition of NxnU, and FIGS. 9(c) and 9(d) illustrate cases where a coding block has been portioned as the asymmetrical 4-block partition of nLxN.

FIG. 9(a) illustrates a case where the skip mode has been applied to a 903a prediction block and 904a prediction block. In this case, motion information of the 903a prediction block is the same as motion information of a 901a block, and motion information of the 904a prediction block is the same as motion information of a 902a block. As a result, results similar to a case where the coding block has been partitioned in the Nx2N partition form can be obtained.

FIG. 9(b) illustrates a case where the skip mode has been applied to a 902b prediction block and a 904b prediction block. In this case, motion information of the 902b prediction block is the same as motion information of a 901b block, and motion information of the 904b prediction block is the same as motion information of a 903b block. As a result, results similar to a case where the coding block has been partitioned in the 2NxnU partition form can be obtained.

FIG. 9(c) illustrates a case where the skip mode has been applied to a 902c prediction block and a 904c prediction block. In this case, motion information of the 902c prediction block is the same as motion information of a 901c block, and motion information of the 904c prediction block is the same as motion information of a 903c block. As a result, results similar to a case where the coding block has been partitioned in the 2NxN partition form can be obtained.

FIG. 9(d) illustrates a case where the skip mode has been applied to a 903d prediction block and a 904d prediction block. In this case, motion information of the 903d prediction block is the same as motion information of a 901d block, and motion information of the 904d prediction block is the same as motion information of a 902d block. As a result, results similar to a case where the coding block has been partitioned in the nLx2N partition form can be obtained.

Accordingly, although a form partitioned as in FIG. 8 has a total of six types, results similar to the eight partition forms illustrated in FIG. 4(b) can be obtained. Accordingly, it is possible to express a part mode using small bits because the number of cases is smaller than that of FIG. 4(b).

In the existing HEVC, if a merge mode is applied to a prediction block, reference is not made to a neighbor prediction block within the same coding block (i.e., the neighbor prediction block is not added to a merge candidate list). In the present invention, such a restriction may not be applied to obtain the same effect as that of the eight partition forms illustrated in FIG. 4(b). That is, another prediction block of a coding block to which a current prediction block belongs may be included in the merge candidate list of the current prediction block (i.e., reference may be made to another prediction block within the same coding block in the skip mode).

Table 2 illustrates a coding unit syntax when a part mode, such as FIG. 8, is used.

TABLE 2

|  | Descriptor |
|---|---|
| coding_unit( x0, y0, log2CbSize ) { <br> ... <br>   if( PartMode = = PART_2Nx2N ) <br>     prediction_unit( x0, y0, nCbS, nCbS ) <br>   else if( PartMode = = PART_NxnU ) { <br>     prediction_unit( x0, y0, nCbS /2, nCbS / 4 ) <br>     prediction_unit( x0 + ( nCbS / 2), y0, nCbS / 2, nCbS / 4 ) <br>     prediction_unit( x0, y0 + ( nCbS / 4 ), nCbS / 2, nCbS * 3 / 4 ) <br>     prediction_unit( x0 + ( nCbS / 2 ), y0 + ( nCbS / 4 ), nCbS / 2, nCbS * 3 / 4 ) <br>   } else if( PartMode = = PART_NxnD ) { <br>     prediction_unit( x0, y0, nCbS / 2, nCbS * 3 / 4 ) <br>     prediction_unit( x0 + ( nCbS / 2), y0, nCbS / 2, nCbS * 3 / 4 ) <br>     prediction_unit( x0, y0 + ( nCbS * 3 / 4 ), nCbS / 2, nCbS / 4 ) <br>     prediction_unit( x0 + ( nCbS / 2), y0 + ( nCbS * 3 / 4 ), nCbS / 2, nCbS / 4 ) <br>   } else if( PartMode = = PART_nLxN ) { <br>     prediction_unit( x0, y0, nCbS / 4, nCbS / 2 ) <br>     prediction_unit( x0 + ( nCbS / 4), y0, nCbS * 3 / 4, nCbS / 2 ) <br>     prediction_unit( x0, y0 + ( nCbS / 2 ), nCbS / 4, nCbS / 2 ) <br>     prediction_unit( x0 + ( nCbS / 4), y0 + ( nCbS / 2 ), nCbS * 3 / 4, nCbS / 2 ) <br>   } else if( PartMode = = PART_nRxN ) { <br>     prediction_unit( x0, y0, nCbS * 3 / 4, nCbS / 2 ) <br>     prediction_unit( x0 + ( nCbS * 3 / 4 ), y0, nCbS / 4, nCbS / 2 ) <br>     prediction_unit( x0, y0 + ( nCbS / 2 ), nCbS * 3 / 4, nCbS / 2 ) <br>     prediction_unit( x0 + ( nCbS * 3 / 4 ), y0 + ( nCbS / 2 ), nCbS / 4, nCbS / 2 ) <br>   } else { /* PART_NxN */ <br>     prediction_unit( x0, y0, nCbS / 2, nCbS / 2 ) |  |

TABLE 2-continued

Descriptor

```
        prediction_unit( x0 + ( nCbS / 2 ), y0, nCbS / 2, nCbS / 2 )
        prediction_unit( x0, y0 + ( nCbS / 2 ), nCbS / 2, nCbS / 2 )
        prediction_unit( x0 + ( nCbS / 2 ), y0 + ( nCbS / 2 ), nCbS / 2, nCbS / 2 )
      }
   }
   ...
}
```

Referring to Table 2, in the decoding process "coding_unit(x0, y0, log 2CbSize)" for a coding unit, the position (x0, y0) of the coding unit and the size (log 2CbSize) of the coding unit are invoked as inputs. In this case, x0, y0 indicates a relative position from the top-left sample of a current picture to the top-left sample of a current coding unit. Furthermore, log 2CbSize indicates the size of the current coding unit.

In the decoding process "prediction_unit(x0, y0, nPbW, nPbH)" for a prediction block, the position (x0', y0') of a prediction unit and the size (nPbW, nPbH) of the prediction unit are invoked as inputs. In this case, x0', y0' indicates a relative position from the top-left sample of a current picture to the top-left sample of a current prediction unit. nPbW, nPbH indicates the horizontal size and vertical size of the current prediction unit.

If the part mode "PartMode" is 2N×2N (i.e., if (PartMode==PART_2N×2N) is true), the position (x0', y0') of a prediction unit is (x0, y0) and the size (nPbW, nPbH) of the prediction unit is (nCbS, nCbS) because the prediction unit is the same as a coding unit.

If the part mode "PartMode" is N×nU (i.e., if (PartMode==PART_N×nU) is true), the position (x0', y0') of a first prediction unit (a top-left prediction unit within a coding unit) is (x0, y0) and the size (nPbW, nPbH) of a prediction unit is (nCbS/2, nCbS/4). Furthermore, the position (x0', y0') of a second prediction unit (a top-right prediction unit within the coding unit) is (x0+(nCbS/2), y0) and the size (nPbW, nPbH) of the prediction unit is (nCbS/2, nCbS/4). Furthermore, the position (x0', y0') of a third prediction unit (a left-bottom prediction unit within the coding unit is (x0, y0+(nCbS/4)) and the size (nPbW, nPbH) of the prediction unit is (nCbS/2, nCbS*¾). Furthermore, the position (x0', y0') of a fourth prediction unit (a right-bottom prediction unit within the coding unit) is (x0+(nCbS/2), y0+(nCbS/4)) and the size (nPbW, nPbH) of the prediction unit is (nCbS/2, nCbS*¾).

If the part mode "PartMode" is N×nD (i.e., if (PartMode==PART_N×nD) is true), the position (x0', y0') of a first prediction unit (a top-left prediction unit within a coding unit) is (x0, y0) and the size (nPbW, nPbH) of a prediction unit is (nCbS/2, nCbS*¾). Furthermore, the position (x0', y0') of a second prediction unit (a top-right prediction unit within the coding unit) is (x0+(nCbS/2), y0) and the size (nPbW, nPbH) of the prediction unit is (nCbS/2, nCbS*¾). Furthermore, the position (x0', y0') of a third prediction unit (a left-bottom prediction unit within the coding unit is (x0, y0+(nCbS*¾)) and the size (nPbW, nPbH) of the prediction unit is (nCbS/2, nCbS/4). Furthermore, the position (x0', y0') of a fourth prediction unit (a right-bottom prediction unit within the coding unit) is (x0+(nCbS/2), y0+(nCbS*¾)) and the size (nPbW, nPbH) of the prediction unit is (nCbS/2, nCbS/4).

If the part mode "PartMode" is nL×N (i.e., if (PartMode==PART_nL×N) is true), the position (x0', y0') of a first prediction unit (a top-left prediction unit within a coding unit) is (x0, y0) and the size (nPbW, nPbH) of a prediction unit is (nCbS/4, nCbS/2). Furthermore, the position (x0', y0') of a second prediction unit (a top-right prediction unit within the coding unit) is (x0+(nCbS/4), y0) and the size (nPbW, nPbH) of the prediction unit is (nCbS*¾, nCbS/2). Furthermore, the position (x0', y0') of a third prediction unit (a left-bottom prediction unit within the coding unit is (x0, y0+(nCbS/2)) and the size (nPbW, nPbH) of the prediction unit is (nCbS/4, nCbS/2). Furthermore, the position (x0', y0') of a fourth prediction unit (a right-bottom prediction unit within the coding unit) is (x0+(nCbS/4), y0+(nCbS/2)) and the size (nPbW, nPbH) of the prediction unit is (nCbS*¾, nCbS/2).

If the part mode "PartMode" is nR×N (i.e., if (PartMode==PART_nR×N) is true), the position (x0', y0') of a first prediction unit (a top-left prediction unit within a coding unit) is (x0, y0) and the size (nPbW, nPbH) of a prediction unit is (nCbS*¾, nCbS/2). Furthermore, the position (x0', y0') of a second prediction unit (a top-right prediction unit within the coding unit) is (x0+(nCbS*¾), y0) and the size (nPbW, nPbH) of the prediction unit is (nCbS/4, nCbS/2). Furthermore, the position (x0', y0') of a third prediction unit (a left-bottom prediction unit within the coding unit is (x0, y0+(nCbS/2)) and the size (nPbW, nPbH) of the prediction unit is (nCbS*¾, nCbS/2). Furthermore, the position (x0', y0') of a fourth prediction unit (a right-bottom prediction unit within the coding unit) is (x0+(nCbS*¾), y0+(nCbS/2)) and the size (nPbW, nPbH) of the prediction unit is (nCbS/4, nCbS/2).

If the part mode "PartMode" is N×N, the position (x0', y0') of a first prediction unit (a top-left prediction unit within a coding unit) is (x0, y0) and the size (nPbW, nPbH) of a prediction unit is (nCbS/2, nCbS/2). Furthermore, the position (x0', y0') of a second prediction unit (a top-right prediction unit within the coding unit) is (x0+(nCbS/2), y0) and the size (nPbW, nPbH) of the prediction unit is (nCbS/2, nCbS/2). Furthermore, the position (x0', y0') of a third prediction unit (a left-bottom prediction unit within the coding unit is (x0, y0+(nCbS/2)) and the size (nPbW, nPbH) of the prediction unit is (nCbS/2, nCbS/2). Furthermore, the position (x0', y0') of a fourth prediction unit (a right-bottom prediction unit within the coding unit) is (x0+(nCbS/2), y0+(nCbS/2)) and the size (nPbW, nPbH) of the prediction unit is (nCbS/2, nCbS/2).

FIG. 10 illustrates block partition forms including asymmetrical 4-block partitions according to an embodiment of the present invention.

Referring to FIG. 10, a coding block may be partitioned into prediction blocks of a total of eight partition forms (part types).

As in FIG. 10(a), 2N×2N that is a form in which a coding block has not been partitioned, 2N×N that is a form in which a coding block has been symmetrically partitioned in a horizontal direction, N×2N that is a form in which a coding block has been symmetrically partitioned in a horizontal direction, and N×N that is a form in which a coding block has been partitioned in a quad-tree form may be defined identically with FIG. 4.

Furthermore, as in FIG. 10(b), asymmetrical 4-block partition forms proposed by the present invention may be defined.

Referring to FIG. 10(b), in the asymmetrical 4-block partitions, partitions of nL×nU, nL×nD, nR×nU, and nR×nD forms may be defined. In this case, "n" may be defined as a value different from N, and may mean a ¼ value of 2N, for example.

FIG. 11 illustrates a case where skip modes are applied in asymmetrical 4-block partition forms according to an embodiment of the present invention.

In particular, FIG. 11 illustrates a case where a skip mode has been applied to the nL×nU and nR×nD part types illustrated in FIG. 10.

FIGS. 11(a) and 11(b) illustrate cases where a coding block has been partitioned as the asymmetrical 4-block partition of nL×nU, and FIGS. 11(c) and 11(d) illustrate cases where a coding block has been partitioned as the asymmetrical 4-block partition of nR×nD.

FIG. 11(a) illustrates a case where the skip mode has been applied to a 1103a prediction block and a 1104a prediction block. In this case, motion information of the 1103a prediction block is the same as motion information of a 1101a block, and motion information of the 1104a prediction block is the same as motion information of a 1102a block. As a result, results similar to a case where a coding block has been partitioned in the nL×2N partition form can be obtained.

FIG. 11(b) illustrates a case where a skip mode has been applied to a 1102b prediction block and a 1104b prediction block. In this case, motion information of the 1102b prediction block is the same as motion information of a 1101b block, and motion information of the 1104b prediction block is the same as motion information of a 1103b block. As a result, results similar to a case where a coding block has been partitioned in the 2N×nU partition form can be obtained.

FIG. 11(c) illustrates a case where a skip mode has been applied to a 1102c prediction block and a 1104c prediction block. In this case, motion information of the 1102c prediction block is the same as motion information of a 1101c block, and motion information of the 1104c prediction block is the same as motion information of a 1103c block. As a result, results similar to a case where a coding block has been partitioned in the 2N×nD partition form can be obtained.

FIG. 11(d) illustrates a case where the skip mode has been applied to a 1103d prediction block and a 1104d prediction block. In this case, motion information of the 1103d prediction block is the same as motion information of a 1101d block, and motion information of the 1104d prediction block is the same as motion information of a 1102d block. As a result, results similar to a case where a coding block has been partitioned in the nR×2N partition form can be obtained.

As described above, the asymmetrical 4-block partition forms of nL×nU, nL×nD, nR×nU, and nR×nD may have the results similar to those of the asymmetrical 2-block partition forms illustrated in FIG. 4.

Furthermore, in order to express a form of a partition in a quad-tree form, a partition form can be expressed once although a partition can be expressed in multiple stages. Accordingly, a number/bits for expressing a partition form of a block can be reduced.

As described above, according to the present invention, in order to obtain effects, such as those of the eight partition forms illustrated in FIG. 4(b), restriction may not be applied to a case where reference is not made to a neighbor prediction block within the same coding block. That is, another prediction block of a coding block to which a current prediction block belongs may be included in the merge candidate list of the current prediction block (i.e., reference may be made to another prediction block within the same coding block in the skip mode).

Table 3 illustrates the syntax of a coding unit when a part mode, such as FIG. 10, is used.

TABLE 3

| | Descriptor |
|---|---|
| coding_unit( x0, y0, log2CbSize ) { <br> ... <br>   if( PartMode = = PART_2Nx2N ) <br>     prediction_unit( x0, y0, nCbS, nCbS ) <br>   else if( PartMode = = PART_nLxnU ) { <br>     prediction_unit( x0, y0, nCbS / 4, nCbS / 4 ) <br>     prediction_unit( x0 + ( nCbS / 4 ), y0, nCbS *3 / 4, nCbS / 4 ) <br>     prediction_unit( x0, y0 + ( nCbS / 4 ), nCbS / 4, nCbS * 3 / 4 ) <br>     prediction_unit( x0 + ( nCbS / 4 ), y0 + ( nCbS / 4 ), nCbS * 3 / 4, nCbS * 3 / 4 ) <br>   } else if( PartMode = = PART_nLxnD ) { <br>     prediction_unit( x0, y0, nCbS / 4, nCbS * 3 / 4 ) <br>     prediction_unit( x0 + ( nCbS / 4 ), y0, nCbS * 3 / 4, nCbS * 3 / 4 ) <br>     prediction_unit( x0, y0 + ( nCbS * 3 / 4 ), nCbS / 4, nCbS / 4 ) <br>     prediction_unit( x0 + ( nCbS / 4 ), y0 + ( nCbS / 4 ), nCbS * 3 / 4, nCbS / 4 ) <br>   } else if( PartMode = = PART_nRxnU ) { <br>     prediction_unit( x0, y0, nCbS * 3 / 4, nCbS / 4 ) <br>     prediction_unit( x0 + ( nCbS * 3 / 4 ), y0, nCbS / 4, nCbS / 4 ) <br>     prediction_unit( x0, y0 + ( nCbS / 4 ), nCbS * 3 / 4, nCbS * 3 / 4 ) <br>     prediction_unit( x0 + ( nCbS * 3 / 4 ), y0 + ( nCbS / 4 ), nCbS / 4, nCbS * 3 / 4 ) <br>   } else if( PartMode = = PART_nRxnD ) { <br>     prediction_unit( x0, y0, nCbS * 3 / 4, nCbS * 3 / 4 ) <br>     prediction_unit( x0 + ( nCbS * 3 / 4 ), y0, nCbS / 4, nCbS * 3 / 4 ) <br>     prediction_unit( x0, y0 + ( nCbS * 3 / 4 ), nCbS * 3 / 4, nCbS / 4 ) | |

TABLE 3-continued

| | Descriptor |
|---|---|
| ```
      prediction_unit( x0 + ( nCbS * 3 / 4 ), y0 + ( nCbS * 3 / 4 ), nCbS /
4, nCbS / 4 )
    } else { /* PART_NxN */
      prediction_unit( x0, y0, nCbS / 2, nCbS / 2 )
      prediction_unit( x0 + ( nCbS / 2 ), y0, nCbS / 2, nCbS / 2 )
      prediction_unit( x0, y0 + ( nCbS / 2 ), nCbS / 2, nCbS / 2 )
      prediction_unit( x0 + ( nCbS / 2 ), y0 + ( nCbS / 2 ), nCbS / 2, nCbS / 2 )
    }
  }
  ...
}
``` | |

Referring to Table 3, in the decoding process "coding_unit(x0, y0, log 2CbSize)" for a coding unit, the position (x0, y0) of the coding unit and the size (log 2CbSize) of the coding unit are invoked as inputs. In this case, x0, y0 indicates a relative position from the top-left sample of a current picture to the top-left sample of a current coding unit. Furthermore, log 2CbSize indicates the size of the current coding unit.

In the decoding process "prediction_unit(x0, y0, nPbW, nPbH)" for a prediction block, the position (x0', y0') of a prediction unit and the size (nPbW, nPbH) of the prediction unit are invoked as inputs. In this case, x0', y0' indicates a relative position from the top-left sample of a current picture to the top-left sample of a current prediction unit. nPbW, nPbH indicates the horizontal size and vertical size of the current prediction unit.

If the part mode "PartMode" is 2N×2N (i.e., if (PartMode==PART_2N×2N) is true), the position (x0', y0') of a prediction unit is (x0, y0) and the size (nPbW, nPbH) of the prediction unit is (nCbS, nCbS) because the prediction unit is the same as a coding unit.

If the part mode "PartMode" is nL×nU (i.e., if (PartMode==PART_nL×nU) is true), the position (x0', y0') of a first prediction unit (a top-left prediction unit within a coding unit) is (x0, y0) and the size (nPbW, nPbH) of a prediction unit is (nCbS/4, nCbS/4). Furthermore, the position (x0', y0') of a second prediction unit (a top-right prediction unit within the coding unit) is (x0+(nCbS/4), y0) and the size (nPbW, nPbH) of the prediction unit is (nCbS*¾, nCbS/4). Furthermore, the position (x0', y0') of a third prediction unit (a left-bottom prediction unit within the coding unit is (x0, y0+(nCbS/4)) and the size (nPbW, nPbH) of the prediction unit is (nCbS/4, nCbS*¾). Furthermore, the position (x0', y0') of a fourth prediction unit (a right-bottom prediction unit within the coding unit) is (x0+(nCbS/4), y0+(nCbS/4)) and the size (nPbW, nPbH) of the prediction unit is (nCbS*¾, nCbS*¾).

If the part mode "PartMode" is nL×nD (i.e., if (PartMode==PART_nL×nD) is true), the position (x0', y0') of a first prediction unit (a top-left prediction unit within a coding unit) is (x0, y0) and the size (nPbW, nPbH) of a prediction unit is (nCbS/4, nCbS*¾). Furthermore, the position (x0', y0') of a second prediction unit (a top-right prediction unit within the coding unit) is (x0+(nCbS/4), y0) and the size (nPbW, nPbH) of the prediction unit is (nCbS*¾, nCbS*¾). Furthermore, the position (x0', y0') of the third prediction unit (a left-bottom prediction unit within the coding unit is (x0, y0+(nCbS*¾)) and the size (nPbW, nPbH) of the prediction unit is (nCbS/4, nCbS/4). Furthermore, the position (x0', y0') of the fourth prediction unit (a right-bottom prediction unit within the coding unit) is (x0+(nCbS/4), y0+(nCbS/4)) and the size (nPbW, nPbH) of the prediction unit is (nCbS*¾, nCbS/4).

If the part mode "PartMode" is nR×nU (i.e., if (PartMode==PART_nR×nU) is true), the position (x0', y0') of a first prediction unit (a top-left prediction unit within a coding unit) is (x0, y0) and the size (nPbW, nPbH) of a prediction unit is (nCbS*¾, nCbS/4). Furthermore, the position (x0', y0') of a second prediction unit (a top-right prediction unit within the coding unit) is (x0+(nCbS*¾), y0) and the size (nPbW, nPbH) of the prediction unit is (nCbS/4, nCbS/4). Furthermore, the position (x0', y0') of a third prediction unit (a left-bottom prediction unit within the coding unit) is (x0, y0+(nCbS/4)) and the size (nPbW, nPbH) of the prediction unit is (nCbS*¾, nCbS*¾). Furthermore, the position (x0', y0') of a fourth prediction unit (a right-bottom prediction unit within the coding unit) is (x0+(nCbS*¾), y0+(nCbS/4)) and the size (nPbW, nPbH) of the prediction unit is (nCbS/4, nCbS*¾).

If the part mode "PartMode" is nR×nD (i.e., if (PartMode==PART_nR×nD) is true), the position (x0', y0') of a first prediction unit (a top-left prediction unit within a coding unit) is (x0, y0) and the size (nPbW, nPbH) of a prediction unit is (nCbS*¾, nCbS*¾). Furthermore, the position (x0', y0') of a second prediction unit (a top-right prediction unit within the coding unit) is (x0+(nCbS*¾), y0) and the size (nPbW, nPbH) of the prediction unit is (nCbS/4, nCbS*¾). Furthermore, the position (x0', y0') of a third prediction unit (a left-bottom prediction unit within the coding unit is (x0, y0+(nCbS*¾)) and the size (nPbW, nPbH) of the prediction unit is (nCbS*¾, nCbS/4). Furthermore, the position (x0', y0') of a fourth prediction unit (a right-bottom prediction unit within the coding unit) is (x0+(nCbS*¾), y0+(nCbS*¾)) and the size (nPbW, nPbH) of the prediction unit is (nCbS/4, nCbS/4).

If the part mode "PartMode" is N×N, the position (x0', y0') of a first prediction unit (a top-left prediction unit within a coding unit) is (x0, y0) and the size (nPbW, nPbH) of a prediction unit is (nCbS/2, nCbS/2). Furthermore, the position (x0', y0') of a second prediction unit (a top-right prediction unit within the coding unit) is (x0+(nCbS/2), y0) and the size (nPbW, nPbH) of the prediction unit is (nCbS/2, nCbS/2). Furthermore, the position (x0', y0') of a third prediction unit (a left-bottom prediction unit within the coding unit is (x0, y0+(nCbS/2)) and the size (nPbW, nPbH) of the prediction unit is (nCbS/2, nCbS/2). Furthermore, the position (x0', y0') of a fourth prediction unit (a right-bottom prediction unit within the coding unit) is (x0+(nCbS/2), y0+(nCbS/2)) and the size (nPbW, nPbH) of the prediction unit is (nCbS/2, nCbS/2).

FIG. 12 is a diagram illustrating an image decoding method according to an embodiment of the present invention.

Referring to FIG. 12, the decoder derives the part mode of a coding block within a predefined part mode set (S1201).

In this case, the predefined part mode set may include an asymmetrical 4-block part mode. Furthermore, in the asymmetrical 4-block part mode, four prediction blocks may be partitioned from the coding block, and at least any one of a horizontal partition and a vertical partition may be defined in an asymmetrical partition form.

For example, the asymmetrical 4-block part mode may be defined as 2N×2N, N×N, N×nU, N×nD, nL×N or nR×N as in FIG. 8.

Alternatively, the asymmetrical 4-block part mode may be defined as 2N×2N, 2N×N, N×2N, N×N, nL×nU, nL×nD, nR×nU or nR×nD as in FIG. 10.

In this case, the part mode may indicate a partition form in which a prediction block is partitioned from a coding block as described above, but is not limited thereto. The part mode may indicate a partition form in which a specific block is partitioned into subblocks.

The decoder decodes a motion parameter (or motion information) in a prediction block unit partitioned from the coding block based on the part mode (S1202).

That is, the decoder derives a prediction mode (e.g., a merge mode or an AMVP mode) for each prediction block and decodes a motion parameter according to the prediction mode applied for each prediction block.

For example, if the merge mode is applied to a prediction block, the decoder may configure a merge candidate list as in the encoder, and may derive motion information of a current prediction block from motion information of a candidate block corresponding to a merge index received from the encoder in the merge candidate list.

For another example, if the AMVP mode is applied to a prediction block, the decoder may configure a motion vector predictor candidate list as in the encoder, and may derive the motion vector predictor of a current processing block from motion information of a candidate block indicated in a motion reference flag received from the encoder in the motion vector predictor candidate list. Furthermore, the decoder may obtain the motion vector value of the current processing block using the derived motion vector predictor and a motion vector difference received from the encoder.

In this case, the motion parameter of the prediction block generated based on an asymmetrical 4-block part mode may be derived from the motion parameter of another neighboring prediction block within the same coding block. That is, the skip mode may be applied to the prediction block generated based on the asymmetrical 4-block part mode.

The decoder generates a predicted block using the decoded motion parameter in the prediction block unit (S1203).

That is, the decoder may perform motion compensation for predicting an image of a current prediction block (i.e., generating the predicted block (an array of predicted samples) of the current prediction block) from a previously decoded picture based on the motion parameter of the prediction block decoded at step S1202.

Meanwhile, in FIG. 12, a part mode including an asymmetrical 4-block part mode (hereinafter referred to as a "first part mode set") (e.g., refer to FIG. 8 or 10) and a part mode not including an asymmetrical 4-block part mode (hereinafter referred to as a "second part mode set") (refer to FIG. 4) may be selectively used.

For example, a flag indicating whether the first part mode set is used or the second part mode set is used may be signaled in a high level syntax (e.g., a slice header, a picture parameter set (PPS), a sequence parameter set (SPS) or a video parameter set (VPS)).

The slice header means the slice segment header of an independent slice segment. In this case, the independent slice segment means a current slice segment or the most recent independent slice segment anterior to a current dependent slice segment in a decoding sequence.

The picture parameter set (PPS) means a syntax structure including a syntax element applied to all of coded pictures of 0 or more determined by a syntax element obtained within each slice segment header.

The sequence parameter set (SPS) means a syntax structure including a syntax element applied to a coded video sequence (CVS) of 0 or more that is determined by the content of a syntax element obtained within a PPS referred by a syntax element obtained within each slice segment header.

The video parameter set (VPS) means a syntax structure including a syntax element that is applied to the CVS of 0 or more determined by the content of a syntax element obtained within an SPS referred by a syntax element within a PPS referred by a syntax element obtained within each slice segment header.

As described above, FIG. 12 illustrates a case where the use the first part mode set is indicated in a high layer syntax if two part mode sets are selectively used.

Alternatively, the flag indicating whether the first part mode set is used or the second part mode set is used may be signaled in a coding block unit. This is described with reference to the following drawing.

FIG. 13 is a diagram illustrating an image decoding method according to an embodiment of the present invention.

Referring to FIG. 13, the decoder decodes a coding unit syntax (S1301).

That is, in order to derive the part mode of a coding block within the coding unit syntax, the decoder may decode (or parse) a flag indicating whether a first part mode set (i.e., a part mode set including an asymmetrical 4-block part mode) is used or a second part mode set (i.e., a part mode set not including an asymmetrical 4-block part mode) is used. In other words, the decoder may decode the flag indicating whether a part mode set used for the partitioning of a current coding block includes an asymmetrical 4-block part mode.

For example, the first part mode set may be defined as 2N×2N, N×N, N×nU, N×nD, nL×N or nR×N as in FIG. 8. Alternatively, the first part mode set may be defined as 2N×2N, 2N×N, N×2N, N×N, nL×nU, nL×nD, nR×nU or nR×nD as in FIG. 10.

Furthermore, the second part mode set may be defined as 2N×2N, 2N×N, N×2N, N×N, 2N×nU, 2N×nD, nL×2N or nR×2N as in FIG. 4.

The decoder may determine whether the first part mode set (i.e., a set including an asymmetrical 4-block part mode) is used or the second part mode set (i.e., a set not including an asymmetrical 4-block part mode) is used by decoding the flag. Furthermore, the decoder may generate a prediction block partitioned from the coding block by deriving the part mode of a corresponding coding block within a predetermined part mode set.

If the first part mode set is not used at step S1302 (i.e., if a part mode set does not include an asymmetrical 4-block part mode), the decoder decodes a prediction unit syntax according to a predetermined part mode within the second part mode set (S1303).

That is, the decoder decodes a motion parameter (or motion information) in a prediction block unit partitioned from the coding block based on a predetermined part mode within the second part mode set.

In contrast, if the first part mode set is used (i.e., if a part mode set includes an asymmetrical 4-block part mode) at step S1302, the decoder decodes a prediction unit syntax according to a predetermined part mode within the first part mode set (S1304).

That is, the decoder decodes a motion parameter (or motion information) in a prediction block unit partitioned from the coding block based on a predetermined part mode within the first part mode set.

The decoder performs motion compensation using the decoded motion parameter (S1305).

That is, the decoder generates a predicted block using the motion parameter decoded in the partitioned prediction block unit. In other words, the decoder may perform motion compensation for predicting an image of a current prediction block from a previously decoded picture (i.e., generating the predicted block (an array of predicted samples) of a current prediction block) based on the motion parameter of the prediction block decoded at step S1303 or S1304.

As in FIG. 13, a case where a part mode set including an asymmetrical 4-block partition is applied and a case where a part mode set not including an asymmetrical 4-block partition is applied may be determined in a coding block unit. Such a method is expressed in Table 4 in the form of syntax.

TABLE 4

|  | Descriptor |
|---|---|
| coding_unit( x0, y0, log2CbSize ) { | |
| ... | |
| if( slice_type != I ) | |
| pred_mode_flag | ae(v) |
| if( CuPredMode[ x0 ][ y0 ] != MODE_INTRA \| \| | |
| log2CbSize = = MinCbLog2SizeY ) { | |
| asymmetric_partioning_flag | ae(v) |
| part_mode | ae(v) |
| } | |
| ... | |
| if ( asymmetric_partitioning_flag ) { | |
| if( PartMode = = PART_2Nx2N ) | |
| prediction_unit( x0, y0, nCbS, nCbS ) | |
| else if( PartMode = = PART_NxnU ) { | |
| ... | |
| } | |
| else { | |
| ... | |
| } | |
| ... | |
| } | |

Referring to Table 4, the decoder parses a prediction mode flag "Pred_mode_flag." For example, if a current slice type is not an I slice, the decoder may parse the prediction mode flag "Pred_mode_flag."

In this case, if the prediction mode flag "Pred_mode_flag" is 0, it indicates that a current coding unit is coded in an inter prediction mode. In contrast, if the prediction mode flag "Pred_mode_flag" is 2, it indicates that a current coding unit is coded in an intra prediction mode.

In order to derive the part mode of a coding block, the decoder parses a flag "asymmetric_partioning_flag" indicating whether a first part mode set (i.e., a part mode set including an asymmetrical 4-block part mode) is used or a second part mode set (i.e., a part mode set not including an asymmetrical 4-block part mode) is used. When asymmetric_partioning_flag is 1, it may indicate the first part mode set is used. When asymmetric_partioning_flag is 0, it may indicate that the second part mode set is used.

The decoder parses a part mode "part_mode." The part mode specifies the partition form of a prediction block from a coding block. One part mode may be determined within the first part mode set because the first part mode set is used when asymmetric_partioning_flag is 1. In contrast, one part mode may be determined within the second part mode set because the second part mode set is used when asymmetric_partioning_flag is 0.

A subsequent syntax may be defined as in Table 2 or Table 3 when asymmetric_partitioning_flag is 1. In contrast, the subsequent syntax may be defined as in Table 1 when asymmetric_partitioning_flag is 0.

FIG. 14 is a diagram illustrating an inter prediction unit according to an embodiment of the present invention.

Referring to FIG. 14, the inter prediction unit implements the functions, processes and/or methods proposed in FIGS. 4 to 13. Furthermore, the inter prediction unit may be combined with some or all of the elements of the encoder illustrated in FIG. 1 and implemented as an encoding apparatus or may be combined with some or all of the elements of the decoder illustrated in FIG. 2 and implemented as a decoding apparatus.

Specifically, the inter prediction unit may include a part mode derivation unit 1401, a motion parameter decoding unit 1402, and a motion compensation unit 1403.

The part mode derivation unit 1401 derives the part mode of a coding block within a predefined part mode set.

In this case, the predefined part mode set may include an asymmetrical 4-block part mode. Furthermore, in the asymmetrical 4-block part mode, a coding block may be partitioned into four prediction blocks, and at least any one of a horizontal partition and a vertical partition may be defined in an asymmetrical partition form.

For example, the asymmetrical 4-block part mode may be defined as 2N×2N, N×N, N×nU, N×nD, nL×N or nR×N as in FIG. 8.

Alternatively, the asymmetrical 4-block part mode may be defined as 2N×2N, 2N×N, N×2N, N×N, nL×nU, nL×nD, nR×nU or nR×nD as in FIG. 10.

Furthermore, in order to derive the part mode of a coding block, the part mode derivation unit 1401 may decode (or parse) a flag indicating whether a first part mode set (i.e., a part mode set including an asymmetrical 4-block part mode) is used or a second part mode set (i.e., a part mode set not including an asymmetrical 4-block part mode) is used. In other words, the part mode derivation unit 1401 may decode a flag indicating whether a part mode set used for the partitioning of a current coding block includes an asymmetrical 4-block part mode.

The motion parameter decoding unit 1402 decodes a motion parameter (or motion information) in a prediction block unit partitioned from a coding block based on a part mode.

That is, the motion parameter decoding unit 1402 decodes a prediction mode (e.g., the merge mode or the AMVP mode) for each prediction block, and decodes a motion parameter according to a prediction mode applied for each prediction block.

For example, if the merge mode is applied to a prediction block, the motion parameter decoding unit 1402 may configure a merge candidate list as in the encoder, and may derive motion information of a current prediction block from motion information of a candidate block corresponding to a merge index received from the encoder in the merge candidate list.

For another example, if the AMVP mode is applied to a prediction block, the motion parameter decoding unit 1402 may configure a motion vector predictor candidate list as in the encoder, and may derive the motion vector predictor of a current processing block using motion information of a candidate block indicated in a motion reference flag received from the encoder in the motion vector predictor candidate list. Furthermore, the motion parameter decoding unit 1402 may obtain the motion vector value of the current processing block using the derived motion vector predictor and a motion vector difference received from the encoder.

In this case, the motion parameter of a prediction block generated based on an asymmetrical 4-block part mode may be derived from the motion parameter of another neighboring prediction block within the same coding block. That is, skip mode may be applied to a prediction block generated based on the asymmetrical 4-block part mode.

The motion compensation unit 1403 generates a predicted block using a motion parameter decoded in a prediction block unit.

That is, the motion compensation unit 1403 may perform motion compensation for predicting an image of a current prediction block (i.e., generating the predicted block (an array of predicted samples) of a current prediction block) from a previously decoded picture based on the motion parameter of a prediction block decoded by the motion parameter decoding unit 1402.

The aforementioned embodiments are the results of combining the elements and characteristics of the present invention in a specific form. Each of the elements or characteristics may be considered to be optional unless separately explicitly described otherwise. Each of the elements or characteristics may be implemented in a form not combined with another element or characteristic. Furthermore, some elements and/or characteristics may be combined to form an embodiment of the present invention. The sequence of the operations described in the embodiments of the present invention may be changed. Some elements or characteristics of a specific embodiment may be included in another embodiment or may be substituted with the corresponding elements or characteristics of another embodiment. It is evident that in the claims, claims not having an explicit citation relation may be combined to form an embodiment or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The aforementioned preferred embodiments of the present invention have been disclosed for illustrative purposes, and those skilled in the art may improve, change, substitute, or add various other embodiments without departing from the technological spirit and scope of the present invention disclosed in the attached claims.

The invention claimed is:

1. A method for a decoding apparatus to decode an image, comprising:
   decoding a flag indicating whether a part mode set comprises an asymmetrical 4-block part mode;
   deriving a part mode of a coding block within the predefined part mode set;
   decoding a motion parameter in a prediction block unit partitioned from the coding block based on the part mode; and
   generating a predicted block using the decoded motion parameter in the prediction block unit,
   wherein when the flag indicates that the part mode set comprises an asymmetrical 4-block part mode, and
   the coding block is partitioned into four prediction blocks in both of a horizontal direction and a vertical direction, and at least one of a horizontal partition and a vertical partition is defined in an asymmetrical partition form such that the asymmetrical 4-block part mode comprises N×nU, N×nD, nL×N, and nR×N or the asymmetrical 4-block part mode comprises nL×nU, nL×nD, nR×nU, and nR×nD, and
   wherein when the flag indicates that the part mode set does not include the asymmetrical 4-block part mode, the part mode set comprises 2N×2N, N×N, 2N×N, N×2N, nL×2N, nR×2N, 2N×nU, and 2N×nD.

2. The method of claim 1, wherein the motion parameter of the prediction block generated based on the asymmetrical 4-block part mode is derived from a motion parameter of another neighboring prediction block within the coding block.

3. The method of claim 1, wherein the flag is transmitted in any one unit of a coding block, a slice, and a picture.

4. A decoding apparatus for decoding an image, comprising:
   a processor configured to:
   decode a flag indicating whether a part mode set comprises an asymmetrical 4-block part mode;
   derive a part mode of a coding block within the predefined part mode set;
   decode a motion parameter in a prediction block unit partitioned from the coding block based on the part mode; and
   generate a predicted block using the decoded motion parameter in the prediction block unit,
   wherein when the flag indicates that the part mode set comprises an asymmetrical 4-block part mode, the coding block is partitioned into four prediction blocks in both of a horizontal direction and a vertical direction, and at least one of a horizontal partition and a vertical partition is defined in an asymmetrical partition form such that the asymmetrical 4-block part mode comprises N×nU, N×nD, nL×N, and nR×N or the asymmetrical 4-block part mode comprises nL×nU, nL×nD, nR×nU, and nR×nD, and wherein when the flag indicates that the part mode set does not include the asymmetrical 4-block part mode, the part mode set comprises 2N×2N, N×N, 2N×N, N×2N, nL×2N, nR×2N, 2N×nU, and 2N×nD.

\* \* \* \* \*